US011863965B2

(12) United States Patent
Dicker et al.

(10) Patent No.: US 11,863,965 B2
(45) Date of Patent: Jan. 2, 2024

(54) INTERAURAL TIME DIFFERENCE CROSSFADER FOR BINAURAL AUDIO RENDERING

(71) Applicant: Magic Leap, Inc., Plantation, FL (US)

(72) Inventors: Samuel Charles Dicker, San Francisco, CA (US); Harsh Mayur Barbhaiya, San Jose, CA (US)

(73) Assignee: Magic Leap, Inc., Plantation, FL (US)

( * ) Notice: Subject to any disclaimer, the term of this patent is extended or adjusted under 35 U.S.C. 154(b) by 0 days.

(21) Appl. No.: 18/161,618

(22) Filed: Jan. 30, 2023

(65) Prior Publication Data

US 2023/0179944 A1 Jun. 8, 2023

Related U.S. Application Data

(63) Continuation of application No. 17/516,407, filed on Nov. 1, 2021, now Pat. No. 11,595,776, which is a (Continued)

(51) Int. Cl.
*H04S 7/00* (2006.01)
*H04R 5/033* (2006.01)
(Continued)

(52) U.S. Cl.
CPC ............... *H04S 7/304* (2013.01); *H04R 3/04* (2013.01); *H04R 5/033* (2013.01); *H04R 5/04* (2013.01);
(Continued)

(58) Field of Classification Search
CPC .......... H04S 7/304; H04S 3/008; H04S 7/307; H04S 2400/01; H04S 2400/11;
(Continued)

(56) References Cited

U.S. PATENT DOCUMENTS 4,852,988 A 8/1989 Velez
6,433,760 B1 8/2002 Vaissie
(Continued)

FOREIGN PATENT DOCUMENTS

CA 2316473 A1 1/2001
CA 2362895 A1 12/2002
(Continued)

OTHER PUBLICATIONS

Chinese Office Action dated Jul. 22, 2022, for CN Application No. 201980080146.2, with English translation, 18 pages.
(Continued)

*Primary Examiner* — Norman Yu
(74) *Attorney, Agent, or Firm* — MORRISON & FOERSTER LLP

(57) ABSTRACT

Examples of the disclosure describe systems and methods for presenting an audio signal to a user of a wearable head device. In an example, a received first input audio signal is processed to generate a left output audio signal and a right output audio signal presented to ears of the user. Processing the first input audio signal comprises applying a delay process to the first input audio signal to generate a left audio signal and a right audio signal; adjusting gains of the left audio signal and the right audio signal; applying head-related transfer functions (HRTFs) to the left and right audio signals to generate the left and right output audio signals. Applying the delay process to the first input audio signal comprises applying an interaural time delay (ITD) to the first input audio signal, the ITD determined based on the source location.

20 Claims, 25 Drawing Sheets

Related U.S. Application Data continuation of application No. 16/593,950, filed on Oct. 4, 2019, now Pat. No. 11,197,118.

(60) Provisional application No. 62/812,546, filed on Mar. 1, 2019, provisional application No. 62/742,191, filed on Oct. 5, 2018, provisional application No. 62/742,254, filed on Oct. 5, 2018.

(51) Int. Cl.
*H04R 5/04* (2006.01)
*H04S 3/00* (2006.01)
*H04R 3/04* (2006.01)

(52) U.S. Cl.
CPC .............. *H04S 3/008* (2013.01); *H04S 7/307* (2013.01); *H04S 2400/01* (2013.01); *H04S 2400/11* (2013.01); *H04S 2400/13* (2013.01); *H04S 2420/01* (2013.01)

(58) Field of Classification Search
CPC ... H04S 2400/13; H04S 2420/01; H04R 3/04; H04R 5/033; H04R 5/04
USPC ....... 381/303, 10, 12, 17, 18, 300, 306, 307, 381/309, 310, 58, 74, 80, 98–99, 103
See application file for complete search history.

(56) References Cited

U.S. PATENT DOCUMENTS

| | | | |
|---|---|---|---|
| 6,491,391 | B1 | 12/2002 | Blum et al. |
| 6,847,336 | B1 | 1/2005 | Lemelson |
| 6,943,754 | B2 | 9/2005 | Aughey |
| 6,977,776 | B2 | 12/2005 | Volkenandt et al. |
| 7,113,610 | B1 * | 9/2006 | Chrysanthakopoulos .................. H04R 5/02 381/310 |
| 7,174,229 | B1 | 2/2007 | Chen |
| 7,347,551 | B2 | 3/2008 | Fergason et al. |
| 7,488,294 | B2 | 2/2009 | Torch |
| 8,235,529 | B1 | 8/2012 | Raffle |
| 8,611,015 | B2 | 12/2013 | Wheeler |
| 8,638,498 | B2 | 1/2014 | Bohn et al. |
| 8,696,113 | B2 | 4/2014 | Lewis |
| 8,929,589 | B2 | 1/2015 | Publicover et al. |
| 9,010,929 | B2 | 4/2015 | Lewis |
| 9,274,338 | B2 | 3/2016 | Robbins et al. |
| 9,292,973 | B2 | 3/2016 | Bar-zeev et al. |
| 9,720,505 | B2 | 8/2017 | Gribetz et al. |
| 10,013,053 | B2 | 7/2018 | Cederlund et al. |
| 10,025,379 | B2 | 7/2018 | Drake et al. |
| 2003/0030597 | A1 | 2/2003 | Geist |
| 2006/0023158 | A1 | 2/2006 | Howell et al. |
| 2011/0211056 | A1 | 9/2011 | Publicover et al. |
| 2011/0213664 | A1 | 9/2011 | Osterhout |
| 2012/0021806 | A1 | 1/2012 | Maltz |
| 2012/0170756 | A1 | 7/2012 | Kraemer et al. |
| 2014/0195918 | A1 | 7/2014 | Friedlander |
| 2015/0168731 | A1 | 6/2015 | Robbins |
| 2015/0373477 | A1 | 12/2015 | Norris et al. |
| 2017/0366913 | A1 | 12/2017 | Stein |
| 2020/0112817 | A1 | 4/2020 | Dicker et al. |
| 2022/0132264 | A1 | 4/2022 | Dicker et al. |

FOREIGN PATENT DOCUMENTS

| | | | |
|---|---|---|---|
| CA | 2388766 | A1 | 12/2003 |
| WO | 2017223110 | A1 | 12/2017 |

OTHER PUBLICATIONS

European Search Report dated Nov. 23, 2021, for EP Application No. 19868338.5, ten pages.
Final Office Action dated Oct. 20, 2020, for U.S. Appl. No. 16/593,950, filed Oct. 4, 2019, 21 pages.
International Preliminary Report on Patentability dated Apr. 15, 2021, for PCT Application No. PCT/US2019/054895, filed Oct. 4, 2019, two pages.
International Search Report and Written Opinion dated Jan. 2, 2020, for PCT Application No. PCT/US2019/54895, filed Oct. 4, 2019, seventeen pages.
Jacob, R. "Eye Tracking in Advanced Interface Design", Virtual Environments and Advanced Interface Design, Oxford University Press, Inc. (Jun. 1995).
Non-Final Office Action dated Apr. 21, 2020, for U.S. Appl. No. 16/593,950, filed Oct. 4, 2019, 19 pages.
Non-Final Office Action dated Mar. 10, 2021, for U.S. Appl. No. 16/593,950, filed Oct. 4, 2019, 20 pages.
Notice of Allowance dated Aug. 10, 2021, for U.S. Appl. No. 16/593,950, filed Oct. 4, 2019, five pages.
Notice of Allowance dated Jan. 3, 2023, for U.S. Appl. No. 17/516,407, filed Nov. 1, 2021, nine pages.
Rolland, J. et al., "High-resolution inset head-mounted display", Optical Society of America, vol. 37, No. 19, Applied Optics, (Jul. 1, 1998).
Tanriverdi, V. et al. (Apr. 2000). "Interacting With Eye Movements in Virtual Environments," Department of Electrical Engineering and Computer Science, Tufts University, Medford, MA 02155, USA, Proceedings of the SIGCHI conference on Human Factors in Computing Systems, eight pages.
Yoshida, A. et al., "Design and Applications of a High Resolution Insert Head Mounted Display", (Jun. 1994).
Chinese Notice of Allowance dated Jan. 5, 2023, for CN Application No. 201980080146.2, with English translation, four pages.

* cited by examiner

INTERAURAL TIME DIFFERENCE CROSSFADER FOR BINAURAL AUDIO RENDERING

REFERENCE TO RELATED APPLICATIONS

This application is a continuation of U.S. patent application Ser. No. 17/516,407, filed on Nov. 1, 2021, which is a continuation of U.S. patent application Ser. No. 16/593,950, filed on Oct. 4, 2019, now U.S. Pat. No. 11,197,118, issued on Dec. 7, 2021, which claims priority to U.S. Provisional Application No. 62/812,546, filed on Mar. 1, 2019, to U.S. Provisional Application No. 62/742,254, filed on Oct. 5, 2018, and to U.S. Provisional Application No. 62/742,191, filed on Oct. 5, 2018, the contents of which are incorporated by reference herein in their entirety.

FIELD

This disclosure relates generally to systems and methods for audio signal processing, and in particular to systems and methods for presenting audio signals in a mixed reality environment.

BACKGROUND

Immersive and believable virtual environments require the presentation of audio signals in a manner that is consistent with a user's expectations—for example, expectations that an audio signal corresponding to an object in a virtual environment will be consistent with that object's location in the virtual environment, and with a visual presentation of that object. Creating rich and complex soundscapes (sound environments) in virtual reality, augmented reality, and mixed-reality environments requires efficient presentation of a large number of digital audio signals, each appearing to come from a different location/proximity and/or direction in a user's environment. Listeners' brains are adapted to recognize differences in the time of arrival of a sound between the user's two ears (e.g., by detecting a phase shift between the two ears); and to infer the spatial origin of the sound from the time difference. Accordingly, for a virtual environment, accurately presenting an interaural time difference (ITD) between the user's left ear and right ear can be critical to a user's ability to identify an audio source in the virtual environment. However, adjusting a soundscape to believably reflect the positions and orientations of the objects and of the user can require rapid changes to audio signals that can result in undesirable sonic artifacts, such as "clicking" sounds, that compromise the immersiveness of a virtual environment. It is desirable for systems and methods of presenting soundscapes to a user of a virtual environment to accurately present interaural time differences to the user's ears, while minimizing sonic artifacts and remaining computationally efficient.

BRIEF SUMMARY

Examples of the disclosure describe systems and methods for presenting an audio signal to a user of a wearable head device. According to an example method, a first input audio signal is received, the first input audio signal corresponding to a source location in a virtual environment presented to the user via the wearable head device. The first input audio signal is processed to generate a left output audio signal and a right output audio signal. The left output audio signal is presented to the left ear of the user via a left speaker associated with the wearable head device. The right output audio signal is presented to the right ear of the user via a right speaker associated with the wearable head device. Processing the first input audio signal comprises applying a delay process to the first input audio signal to generate a left audio signal and a right audio signal; adjusting a gain of the left audio signal; adjusting a gain of the right audio signal; applying a first head-related transfer function (HRTF) to the left audio signal to generate the left output audio signal; and applying a second HRTF to the right audio signal to generate the right output audio signal. Applying the delay process to the first input audio signal comprises applying an interaural time delay (ITD) to the first input audio signal, the ITD determined based on the source location.

DETAILED DESCRIPTION

In the following description of examples, reference is made to the accompanying drawings which form a part hereof, and in which it is shown by way of illustration specific examples that can be practiced. It is to be understood that other examples can be used and structural changes can be made without departing from the scope of the disclosed examples.

Example Wearable System

Figure 23:
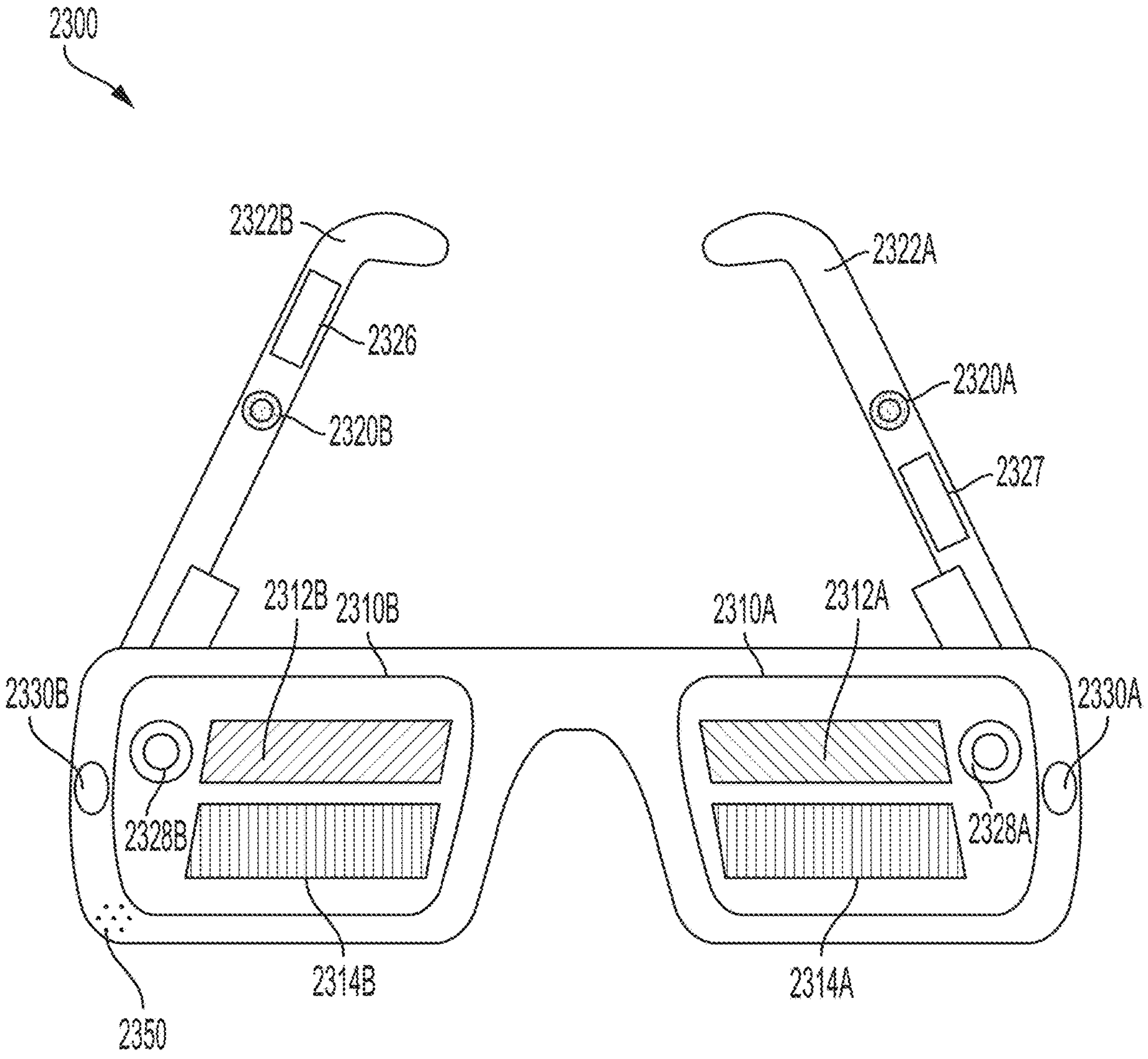
FIG. 23 illustrates an example wearable system, according to some embodiments of the disclosure.

FIG. 23 illustrates an example wearable head device 2300 configured to be worn on the head of a user. Wearable head device 2300 may be part of a broader wearable system that includes one or more components, such as a head device (e.g., wearable head device 2300), a handheld controller (e.g., handheld controller 2400 described below), and/or an auxiliary unit (e.g., auxiliary unit 2500 described below). In some examples, wearable head device 2300 can be used for virtual reality, augmented reality, or mixed reality systems or applications. Wearable head device 2300 can include one or more displays, such as displays 2310A and 2310B (which may include left and right transmissive displays, and associated components for coupling light from the displays to the user's eyes, such as orthogonal pupil expansion (OPE) grating sets 2312A/2312B and exit pupil expansion (EPE) grating sets 2314A/2314B); left and right acoustic structures, such as speakers 2320A and 2320B (which may be mounted on temple arms 2322A and 2322B, and positioned adjacent to the user's left and right ears, respectively); one or more sensors such as infrared sensors, accelerometers, GPS units, inertial measurement units (IMUs, e.g. IMU 2326), acoustic sensors (e.g., microphones 2350); orthogonal coil electromagnetic receivers (e.g., receiver 2327 shown mounted to the left temple arm 2322A); left and right cameras (e.g., depth (time-of-flight) cameras 2330A and 2330B) oriented away from the user; and left and right eye cameras oriented toward the user (e.g., for detecting the user's eye movements)(e.g., eye cameras 2328A and 2328B). However, wearable head device 2300 can incorporate any suitable display technology, and any suitable number, type, or combination of sensors or other components without departing from the scope of the invention. In some examples, wearable head device 2300 may incorporate one or more microphones 150 configured to detect audio signals generated by the user's voice; such microphones may be positioned adjacent to the user's mouth. In some examples, wearable head device 2300 may incorporate networking features (e.g., Wi-Fi capability) to communicate with other devices and systems, including other wearable systems. Wearable head device 2300 may further include components such as a battery, a processor, a memory, a storage unit, or various input devices (e.g., buttons, touchpads); or may be coupled to a handheld controller (e.g., handheld controller 2400) or an auxiliary unit (e.g., auxiliary unit 2500) that includes one or more such components. In some examples, sensors may be configured to output a set of coordinates of the head-mounted unit relative to the user's environment, and may provide input to a processor performing a Simultaneous Localization and Mapping (SLAM) procedure and/or a visual odometry algorithm. In some examples, wearable head device 2300 may be coupled to a handheld controller 2400, and/or an auxiliary unit 2500, as described further below.

Figure 24:
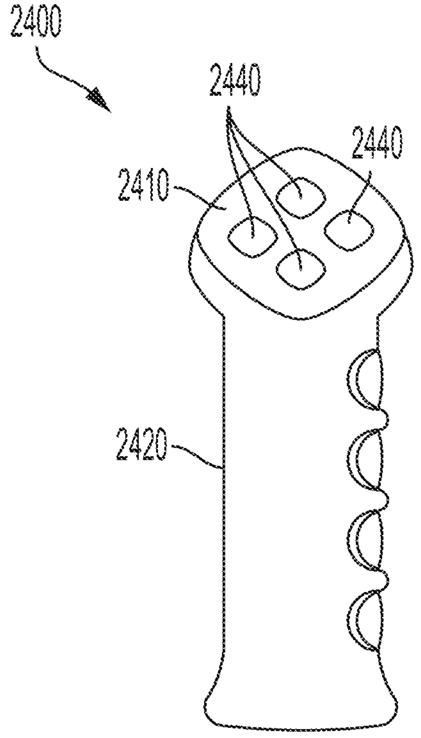
FIG. 24 illustrates an example handheld controller that can be used in conjunction with an example wearable system, according to some embodiments of the disclosure.

FIG. 24 illustrates an example mobile handheld controller component 2400 of an example wearable system. In some examples, handheld controller 2400 may be in wired or wireless communication with wearable head device 2300 and/or auxiliary unit 2500 described below. In some examples, handheld controller 2400 includes a handle portion 2420 to be held by a user, and one or more buttons 2440 disposed along a top surface 2410. In some examples, handheld controller 2400 may be configured for use as an optical tracking target; for example, a sensor (e.g., a camera or other optical sensor) of wearable head device 2300 can be configured to detect a position and/or orientation of handheld controller 2400—which may, by extension, indicate a position and/or orientation of the hand of a user holding handheld controller 2400. In some examples, handheld controller 2400 may include a processor, a memory, a storage unit, a display, or one or more input devices, such as described above. In some examples, handheld controller 2400 includes one or more sensors (e.g., any of the sensors or tracking components described above with respect to wearable head device 2300). In some examples, sensors can detect a position or orientation of handheld controller 2400 relative to wearable head device 2300 or to another component of a wearable system. In some examples, sensors may be positioned in handle portion 2420 of handheld controller 2400, and/or may be mechanically coupled to the handheld controller. Handheld controller 2400 can be configured to provide one or more output signals, corresponding, for example, to a pressed state of the buttons 2440; or a position, orientation, and/or motion of the handheld controller 2400 (e.g., via an IMU). Such output signals may be used as input to a processor of wearable head device 2300, to auxiliary unit 2500, or to another component of a wearable system. In some examples, handheld controller 2400 can include one or more microphones to detect sounds (e.g., a user's speech, environmental sounds), and in some cases provide a signal corresponding to the detected sound to a processor (e.g., a processor of wearable head device 2300).

Figure 25:
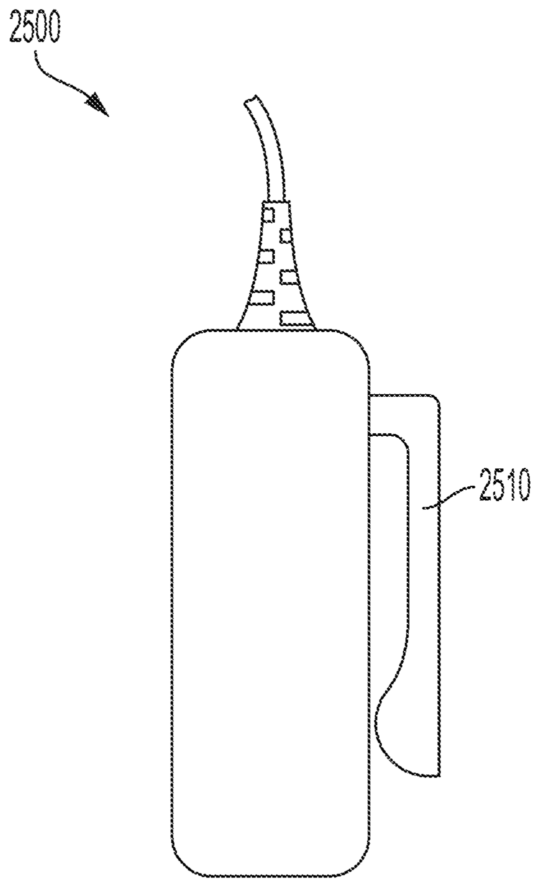
FIG. 25 illustrates an example auxiliary unit that can be used in conjunction with an example wearable system, according to some embodiments of the disclosure.

FIG. 25 illustrates an example auxiliary unit 2500 of an example wearable system. In some examples, auxiliary unit 2500 may be in wired or wireless communication with wearable head device 2300 and/or handheld controller 2400. The auxiliary unit 2500 can include a battery to provide energy to operate one or more components of a wearable system, such as wearable head device 2300 and/or handheld controller 2400 (including displays, sensors, acoustic structures, processors, microphones, and/or other components of wearable head device 2300 or handheld controller 2400). In some examples, auxiliary unit 2500 may include a processor, a memory, a storage unit, a display, one or more input devices, and/or one or more sensors, such as described above. In some examples, auxiliary unit 2500 includes a clip 2510 for attaching the auxiliary unit to a user (e.g., a belt worn by the user). An advantage of using auxiliary unit 2500 to house one or more components of a wearable system is that doing so may allow large or heavy components to be carried on a user's waist, chest, or back—which are relatively well suited to support large and heavy objects—rather than mounted to the user's head (e.g., if housed in wearable head device 2300) or carried by the user's hand (e.g., if housed in handheld controller 2400). This may be particularly advantageous for relatively heavy or bulky components, such as batteries.

Figure 26:
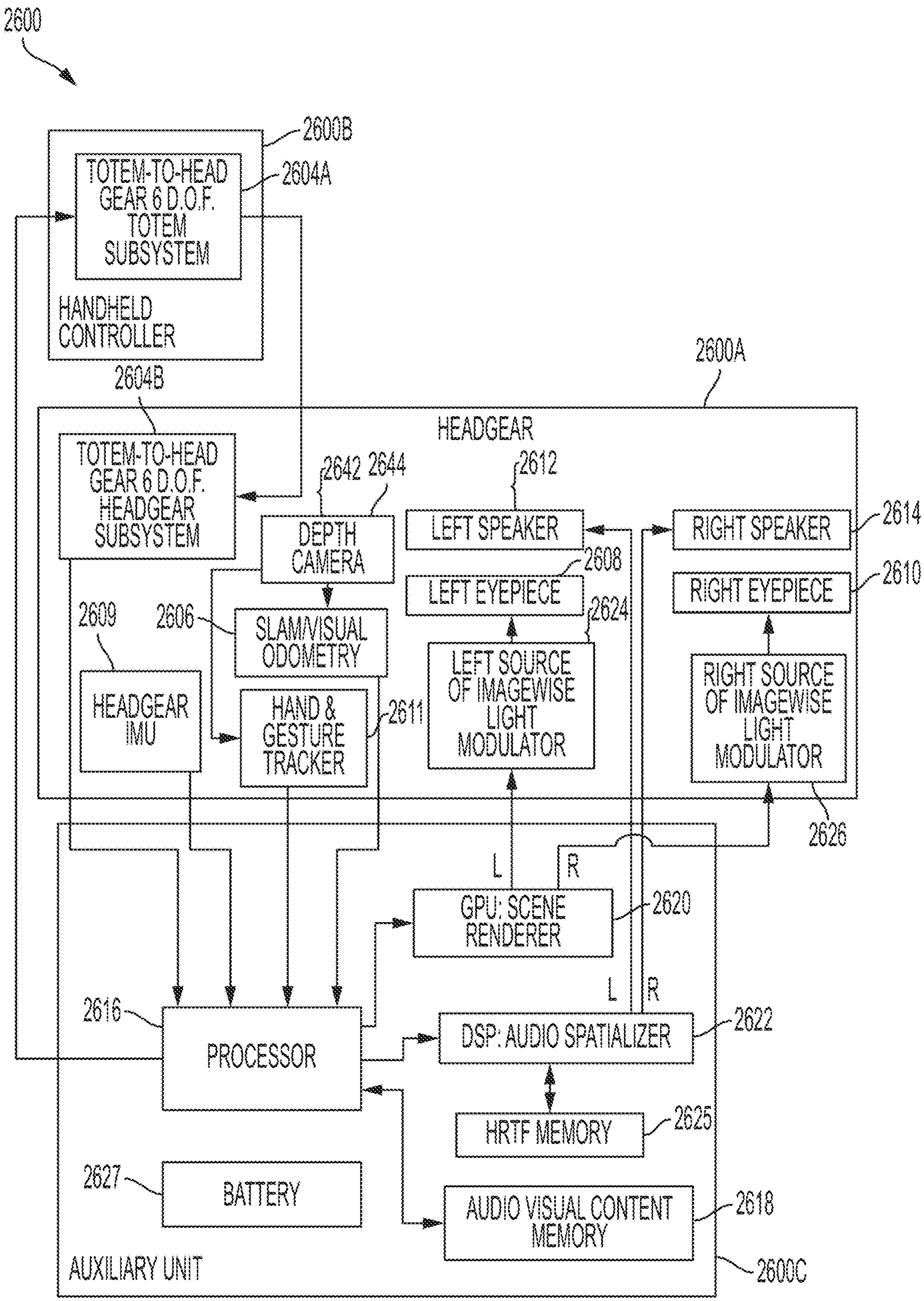
FIG. 26 illustrates an example functional block diagram for an example wearable system, according to some embodiments of the disclosure.

FIG. 26 shows an example functional block diagram that may correspond to an example wearable system 2600, such as may include example wearable head device 2300, handheld controller 2400, and auxiliary unit 2500 described above. In some examples, the wearable system 2600 could be used for virtual reality, augmented reality, or mixed reality applications. As shown in FIG. 26, wearable system 2600 can include example handheld controller 2600B, referred to here as a "totem" (and which may correspond to handheld controller 2400 described above); the handheld controller 2600B can include a totem-to-headgear six degree of freedom (6DOF) totem subsystem 2604A. Wearable system 2600 can also include example headgear device 2600A (which may correspond to wearable head device 2300 described above); the headgear device 2600A includes a totem-to-headgear 6DOF headgear subsystem 2604B. In the example, the 6DOF totem subsystem 2604A and the 6DOF headgear subsystem 2604B cooperate to determine six coordinates (e.g., offsets in three translation directions and rotation along three axes) of the handheld controller 2600B relative to the headgear device 2600A. The six degrees of freedom may be expressed relative to a coordinate system of the headgear device 2600A. The three translation offsets may be expressed as X, Y, and Z offsets in such a coordinate system, as a translation matrix, or as some other representation. The rotation degrees of freedom may be expressed as sequence of yaw, pitch and roll rotations; as vectors; as a rotation matrix; as a quaternion; or as some other representation. In some examples, one or more depth cameras 2644 (and/or one or more non-depth cameras) included in the headgear device 2600A; and/or one or more optical targets (e.g., buttons 2440 of handheld controller 2400 as described above, or dedicated optical targets included in the handheld controller) can be used for 6DOF tracking. In some examples, the handheld controller 2600B can include a camera, as described above; and the headgear device 2600A can include an optical target for optical tracking in conjunction with the camera. In some examples, the headgear device 2600A and the handheld controller 2600B each include a set of three orthogonally oriented solenoids which are used to wirelessly send and receive three distinguishable signals. By measuring the relative magnitude of the three distinguishable signals received in each of the coils used for receiving, the 6DOF of the handheld controller 2600B relative to the headgear device 2600A may be determined. In some examples, 6DOF totem subsystem 2604A can include an Inertial Measurement Unit (IMU) that is useful to provide improved accuracy and/or more timely information on rapid movements of the handheld controller 2600B.

In some examples involving augmented reality or mixed reality applications, it may be desirable to transform coordinates from a local coordinate space (e.g., a coordinate space fixed relative to headgear device 2600A) to an inertial coordinate space, or to an environmental coordinate space. For instance, such transformations may be necessary for a display of headgear device 2600A to present a virtual object at an expected position and orientation relative to the real environment (e.g., a virtual person sitting in a real chair, facing forward, regardless of the position and orientation of headgear device 2600A), rather than at a fixed position and orientation on the display (e.g., at the same position in the display of headgear device 2600A). This can maintain an illusion that the virtual object exists in the real environment (and does not, for example, appear positioned unnaturally in the real environment as the headgear device 2600A shifts and rotates). In some examples, a compensatory transformation between coordinate spaces can be determined by processing imagery from the depth cameras 2644 (e.g., using a Simultaneous Localization and Mapping (SLAM) and/or visual odometry procedure) in order to determine the transformation of the headgear device 2600A relative to an inertial or environmental coordinate system. In the example shown in FIG. 26, the depth cameras 2644 can be coupled to a SLAM/visual odometry block 2606 and can provide imagery to block 2606. The SLAM/visual odometry block 2606 implementation can include a processor configured to process this imagery and determine a position and orientation of the user's head, which can then be used to identify a transformation between a head coordinate space and a real coordinate space. Similarly, in some examples, an additional source of information on the user's head pose and location is obtained from an IMU 2609 of headgear device 2600A. Information from the IMU 2609 can be integrated with information from the SLAM/visual odometry block 2606 to provide improved accuracy and/or more timely information on rapid adjustments of the user's head pose and position.

In some examples, the depth cameras 2644 can supply 3D imagery to a hand gesture tracker 2611, which may be implemented in a processor of headgear device 2600A. The hand gesture tracker 2611 can identify a user's hand gestures, for example by matching 3D imagery received from the depth cameras 2644 to stored patterns representing hand gestures. Other suitable techniques of identifying a user's hand gestures will be apparent.

In some examples, one or more processors 2616 may be configured to receive data from headgear subsystem 2604B, the IMU 2609, the SLAM/visual odometry block 2606, depth cameras 2644, microphones 2650; and/or the hand gesture tracker 2611. The processor 2616 can also send and receive control signals from the 6DOF totem system 2604A. The processor 2616 may be coupled to the 6DOF totem system 2604A wirelessly, such as in examples where the handheld controller 2600B is untethered. Processor 2616 may further communicate with additional components, such as an audio-visual content memory 2618, a Graphical Processing Unit (GPU) 2620, and/or a Digital Signal Processor (DSP) audio spatializer 2622. The DSP audio spatializer 2622 may be coupled to a Head Related Transfer Function (HRTF) memory 2625. The GPU 2620 can include a left channel output coupled to the left source of imagewise modulated light 2624 and a right channel output coupled to the right source of imagewise modulated light 2626. GPU 2620 can output stereoscopic image data to the sources of imagewise modulated light 2624, 2626. The DSP audio spatializer 2622 can output audio to a left speaker 2612 and/or a right speaker 2614. The DSP audio spatializer 2622 can receive input from processor 2616 indicating a direction vector from a user to a virtual sound source (which may be moved by the user, e.g., via the handheld controller 2600B). Based on the direction vector, the DSP audio spatializer 2622 can determine a corresponding HRTF (e.g., by accessing a HRTF, or by interpolating multiple HRTFs). The DSP audio spatializer 2622 can then apply the determined HRTF to an audio signal, such as an audio signal corresponding to a virtual sound generated by a virtual object. This can enhance the believability and realism of the virtual sound, by incorporating the relative position and orientation of the user relative to the virtual sound in the mixed reality environment—that is, by presenting a virtual sound that matches a user's expectations of what that virtual sound would sound like if it were a real sound in a real environment.

In some examples, such as shown in FIG. 26, one or more of processor 2616, GPU 2620, DSP audio spatializer 2622, HRTF memory 2625, and audio/visual content memory 2618 may be included in an auxiliary unit 2600C (which may correspond to auxiliary unit 2500 described above). The auxiliary unit 2600C may include a battery 2627 to power its components and/or to supply power to headgear device 2600A and/or handheld controller 2600B. Including such components in an auxiliary unit, which can be mounted to a user's waist, can limit the size and weight of headgear device 2600A, which can in turn reduce fatigue of a user's head and neck.

While FIG. 26 presents elements corresponding to various components of an example wearable system 2600, various other suitable arrangements of these components will become apparent to those skilled in the art. For example, elements presented in FIG. 26 as being associated with auxiliary unit 2600C could instead be associated with headgear device 2600A or handheld controller 2600B. Furthermore, some wearable systems may forgo entirely a handheld controller 2600B or auxiliary unit 2600C. Such changes and modifications are to be understood as being included within the scope of the disclosed examples.

Audio Rendering

The systems and methods described below can be implemented in an augmented reality or mixed reality system, such as described above. For example, one or more processors (e.g., CPUs, DSPs) of an augmented reality system can be used to process audio signals or to implement steps of computer-implemented methods described below; sensors of the augmented reality system (e.g., cameras, acoustic sensors, IMUs, LIDAR, GPS) can be used to determine a position and/or orientation of a user of the system, or of elements in the user's environment; and speakers of the augmented reality system can be used to present audio signals to the user.

In augmented reality or mixed reality systems such as described above, one or more processors (e.g., DSP audio spatializer 2622) can process one or more audio signals for presentation to a user of a wearable head device via one or more speakers (e.g., left and right speakers 2612/2614 described above). In some embodiments, the one or more speakers may belong to a unit separate from the wearable head device (e.g., headphones). Processing of audio signals requires tradeoffs between the authenticity of a perceived audio signal—for example, the degree to which an audio signal presented to a user in a mixed reality environment matches the user's expectations of how an audio signal would sound in a real environment—and the computational overhead involved in processing the audio signal. Realistically spatializing an audio signal in a virtual environment can be critical to creating immersive and believable user experiences.

Figure 1:
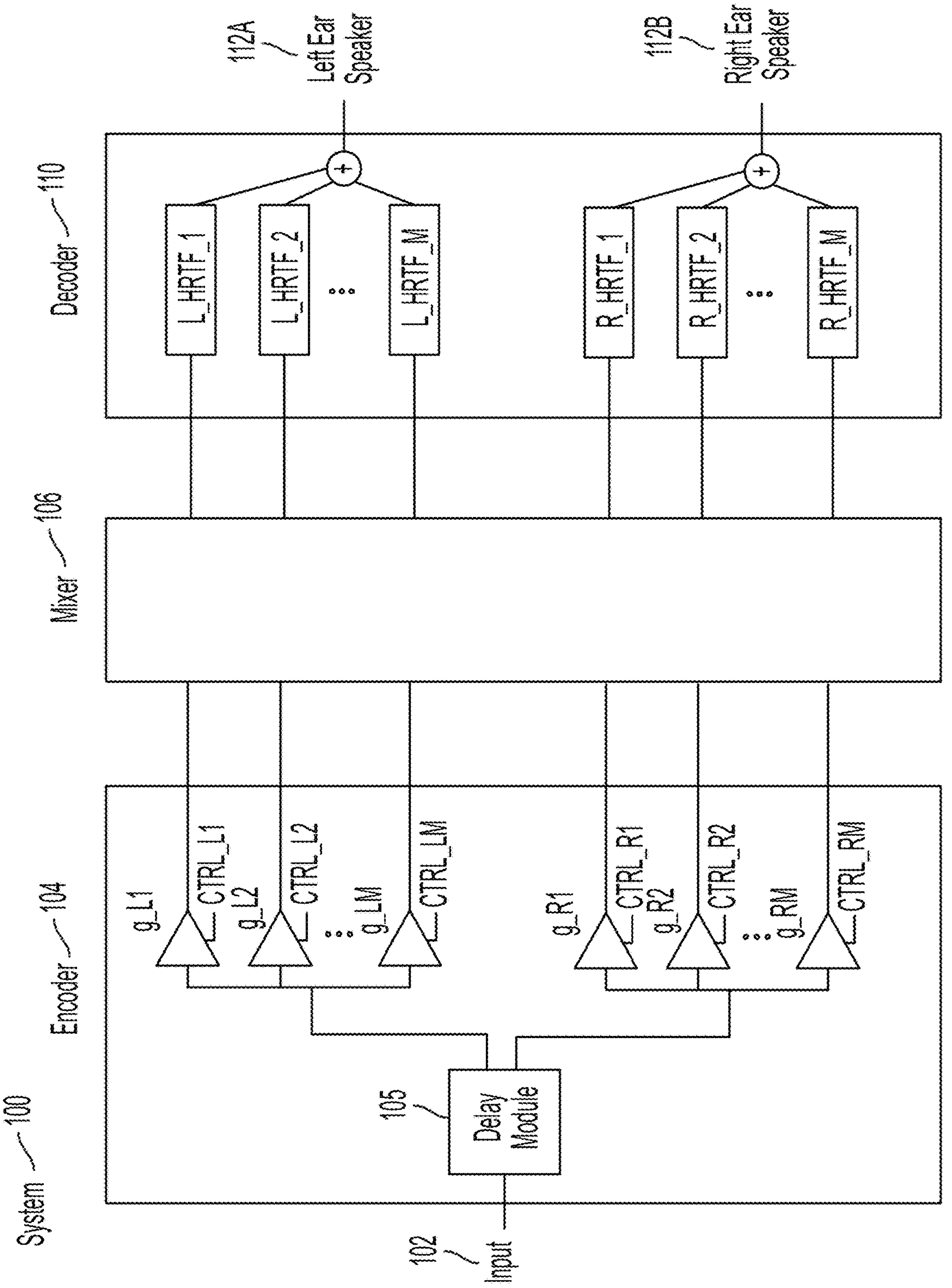
FIG. 1 illustrates an example audio spatialization system, according to some embodiments of the disclosure.

FIG. 1 illustrates an example spatialization system 100, according to some embodiments. The system 100 creates a soundscape (sound environment) by spatializing input sounds/signals. The system 100 includes an encoder 104, a mixer 106, and a decoder 110.

The system 100 receives an input signal 102. The input signals 102 may include digital audio signals corresponding to the objects to be presented in the soundscape. In some embodiments, the digital audio signals may be a pulse-code modulated (PCM) waveform of audio data.

The encoder 104 receives the input signal 102 and outputs one or more left gain adjusted signals and one or more right gain adjusted signals. In the example, the encoder 104 includes a delay module 105. Delay module 105 can include a delay process that can be executed by a processor (such as a processor of an augmented reality system described above). In order to make the objects in the soundscape appear to originate from specific locations, the encoder 104 accordingly delays the input signal 102 using the delay module 105 and sets values of control signals (CTRL_L1 . . . CRTL_LM and CTRL_R1 . . . CTRL_RM) input to gain modules (g_L1 . . . g_LM and g_R1 . . . g_RM).

The delay module 105 receives the input signal 102 and outputs a left ear delay and a right ear delay. The left ear delay is input to left gain modules (g_L1 . . . g_LM) and the right ear delay is input to right gain modules (g_R1 . . . g_RM). The left ear delay may be the input signal 102 delayed by a first value, and the right ear delay may be the input signal 102 delayed by a second value. In some embodiments, the left ear delay and/or the right ear delay may be zero in which case the delay module 105 effectively routes the input signal 102 to the left gain modules and/or the right gain modules, respectively. An interaural time difference (ITD) may be a difference between the left ear delay and the right ear delay.

One or more left control signals (CTRL_L1 . . . CTRL LM) are input to the one or more left gain modules and one or more right control values (CTRL_R1 . . . CTRL_RM) are input to the one or more right gain modules. The one or more left gain modules output the one or more left gain adjusted signals and the one or more right gain modules output the one or more right gain adjusted signals.

Each of the one or more left gain modules adjusts the gain of the left ear delay based on a value of a control signal of the one or more left control signals and each of the one or more right gain modules adjusts the gain of the right ear delay based on a value of a control signal of the one or more right control signals.

The encoder 104 adjusts values of the control signals input to the gain modules based on a location of the object to be presented in the soundscape the input signal 102 corresponds to. Each gain module may be a multiplier that multiplies the input signal 102 by a factor that is a function of a value of a control signal.

The mixer 106 receives gain adjusted signals from the encoder 104, mixes the gain adjusted signals, and outputs mixed signals. The mixed signals are input to the decoder 110 and the outputs of the decoder 110 are input to a left ear speaker 112A and a right ear speaker 112B (hereinafter collectively referred to as "speakers 112").

The decoder 110 includes left HRTF filters L_HRTF_1-M and right HRTF filters R_HRTF_1-M. The decoder 110 receives mixed signals from the mixer 106, filters and sums the mixed signals, and outputs filtered signals to the speakers 112. A first summing block/circuit of the decoder 110 sums left filtered signals output from the left HRTF filters and a second summing block/circuit of the decoder 110 sums right filtered signals output from the right HRTF filters.

In some embodiments, the decoder 110 may include a cross-talk canceller to transform a position of a left/right physical speaker to a position of a respective ear, such as those described in Jot, et al, Binaural Simulation of Complex Acoustic Scenes for Interactive Audio, Audio Engineering Society Convention Paper, presented Oct. 5-8, 2006, the contents of which are hereby incorporated by reference in its entirety.

In some embodiments, the decoder 110 may include a bank of HRTF filters. Each of the HRTF filters in the bank may model a specific direction relative to a user's head. These methods may be based on decomposition of HRTF data over a fixed set of spatial functions and a fixed set of basis filters. In these embodiments, each mixed signal from the mixer 106 may be mixed into inputs of the HRTF filters that model directions that are closest to a source's direction. The levels of the signals mixed into each of those HRTF filters are determined by the specific direction of the source.

In some embodiments, the system 100 may receive multiple input signals and may include an encoder for each of the multiple input signals. The total number of input signals may represent the total number of objects to be presented in the soundscape.

If a direction of the object presented in the soundscape changes, not only can the encoder 104A change the value of the one or more left control signals and the one or more right control signals input to the one or more left gain modules and the one or more right gain modules, the delay module 105 may change a delay of the input signal 102 producing a left ear delay and/or a right ear delay to appropriately present the objects in the soundscape.

Figure 2A:
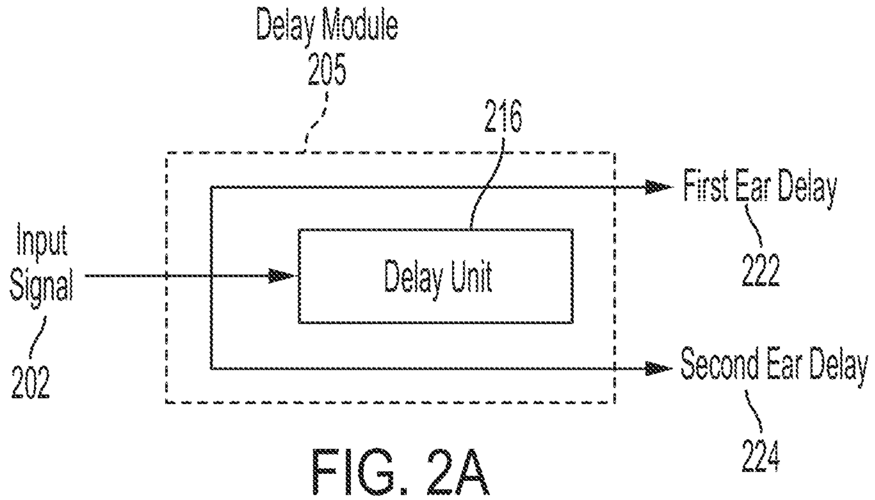
FIGS. 2A-2C illustrate example delay modules, according to some embodiments of the disclosure.
Figure 2B:
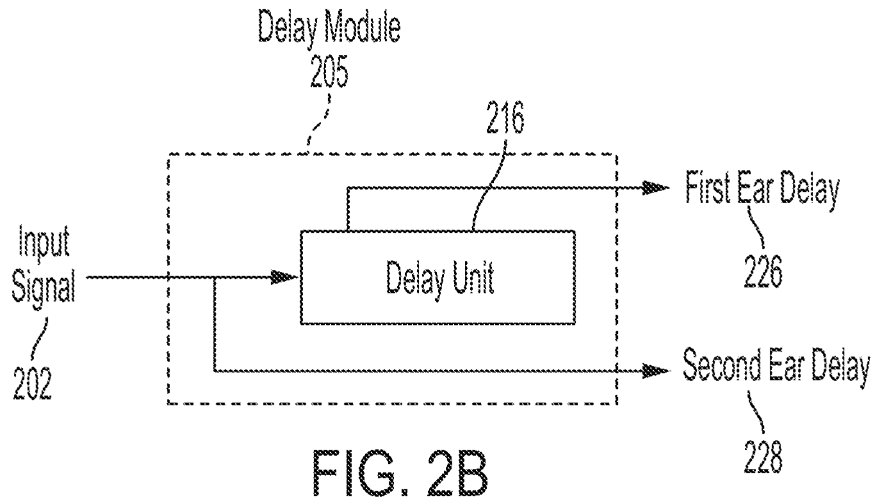
Figure 2C:
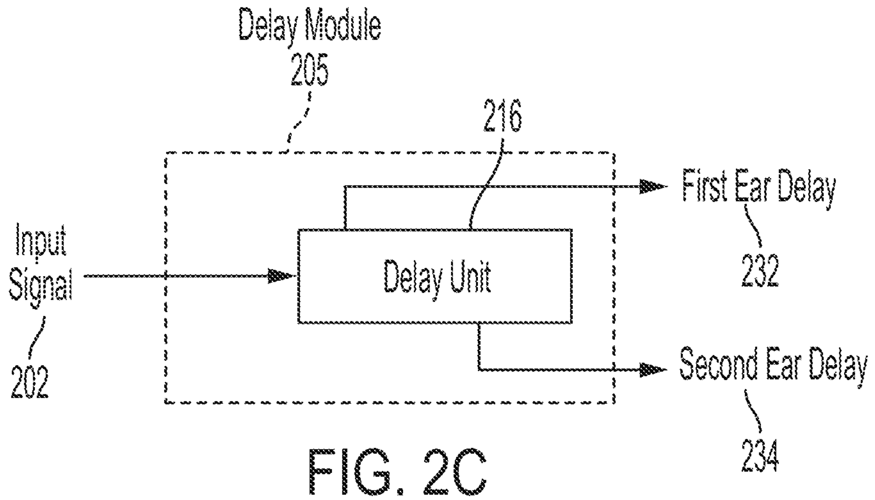

FIGS. 2A-2C illustrate various modes of a delay module 205, according to some embodiments. The delay module 205 may include a delay unit 216 which delays an input signal by a value, for example, a time value, a sample count, and the like. One or more of the example delay modules shown in FIGS. 2A-2C may be used to implement delay module 105 shown in example system 100.

FIG. 2A illustrates a zero tap delay mode of the delay module 205, according to some embodiments. In the zero tap delay mode, an input signal 202 is split to create a first ear delay 222 and a second ear delay 224. The delay unit 216 receives the input signal 202 but does not delay the input signal 202. In some embodiments, the delay unit 216 receives the input signal 202 and fills a buffer with samples of the input signal 202 which then may be used if the delay module 205 transitions to a one tap delay mode or a two tap delay mode (described below). The delay module 205 outputs the first ear delay 222 and the second ear delay 224, which is simply the input signal 202 (with no delays).

FIG. 2B illustrates a one tap delay mode of the delay module 205, according to some embodiments. In the one tap delay mode, the input signal 202 is split to create a second ear delay 228. The delay unit 216 receives the input signal 202, delays the input signal 202 by a first value, and outputs a first ear delay 226. The second ear delay 228 is simply the input signal 202 (with no delays). The delay module 205 outputs the first ear delay 226 and the second ear delay 228. In some embodiments, the first ear delay 226 may be a left ear delay and the second ear delay 228 may be a right ear delay. In some embodiments, the first ear delay 226 may be a right ear delay and the second ear delay 228 may be a left ear delay.

FIG. 2C illustrates a two tap delay mode of the delay module 205, according to some embodiments. In the two tap delay mode, the delay unit 216 receives the input signal 202, delays the input signal 202 by a first value and outputs a first ear delay 232, and delays the input signal 202 by a second value and outputs a second ear delay 234. In some embodiments, the first ear delay 232 may be a left ear delay and the second ear delay 234 may be a right ear delay. In some embodiments, the first ear delay 232 may be a right ear delay and the second ear delay 234 may be a left ear delay.

In some embodiments, a soundscape (sound environment) may be presented to a user. The following discussion is with respect to a soundscape with a single virtual object; however, the principles described herein may be applicable to soundscapes with many virtual objects.

Figure 3A:
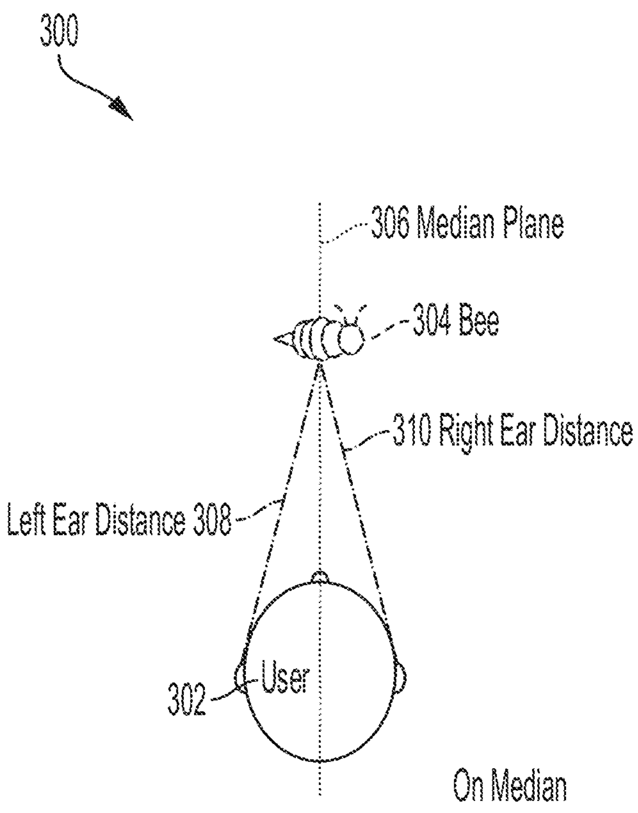
FIGS. 3A-3B illustrate an example virtual sound source with respect to a listener, and an example corresponding delay module, respectively, according to some embodiments of the disclosure.

FIG. 3A illustrates an environment 300 including a user 302 and a virtual object (bee) 304 on a median plane 306, according to some embodiments. A distance 308 from a left ear of the user 302 to the virtual bee 304 is equal to a distance 310 from a right ear of the user 302 to the virtual bee 304. As such, it should take sound from the virtual bee 304 the same amount of time to reach both the left ear and the right ear.

Figure 3B:
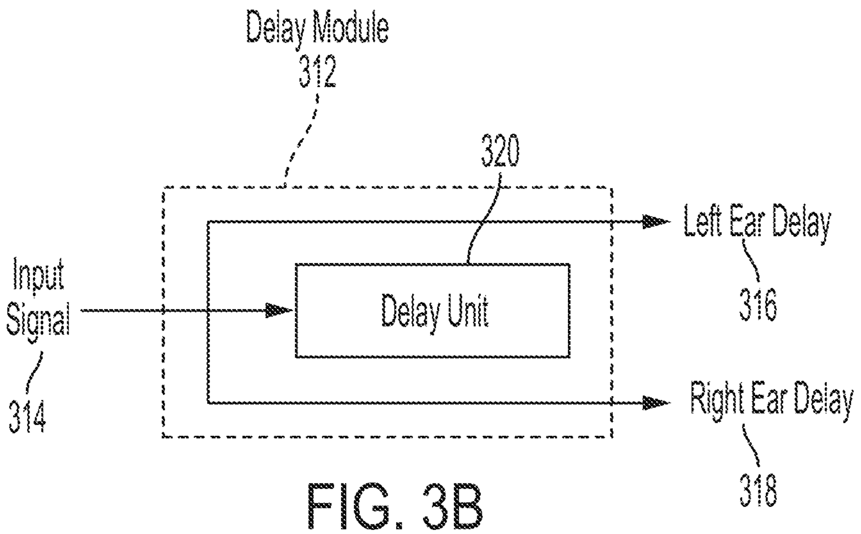

FIG. 3B illustrates a delay module 312 corresponding to the environment 300 of FIG. 3A, according to some embodiments. The delay module 312 may be used to implement delay module 105 shown in example system 100. As illustrated in FIG. 3B, the delay module 312 is in a zero tap delay mode, and an input signal 314 is split to create a left ear delay 316 and a right ear delay 318. The left ear delay 316 and the right ear delay 318 are simply the input signal 314 since the distance 308 and the distance 310 are the same. A delay unit 320 receives the input signal 314 but does not output a signal. In some embodiments, the delay unit 316 receives the input signal 314 and fills a buffer with samples of the input signal 314 which then may be used if the delay module 312 transitions to a one tap delay mode or a two tap delay mode. The delay module 312 outputs the left ear delay 316 and the right ear delay 318.

Figure 4A:
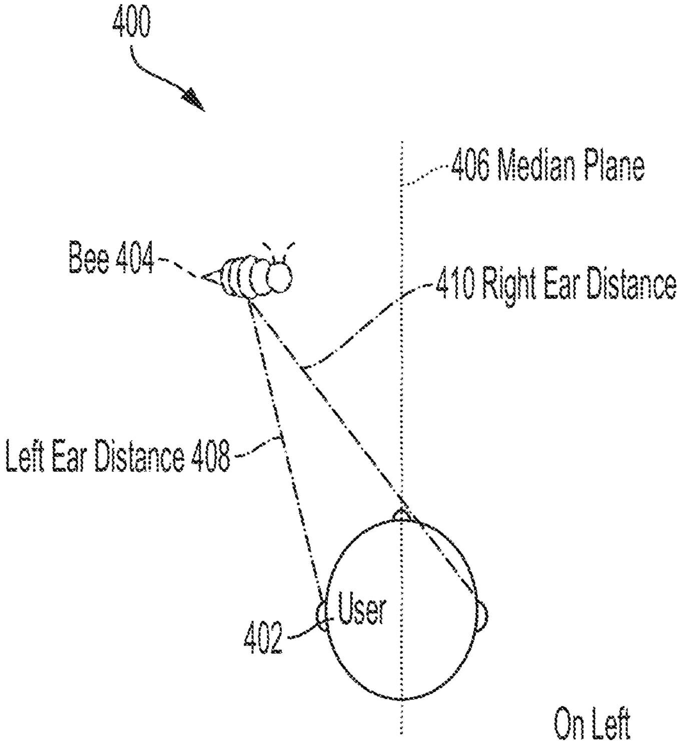
FIGS. 4A-4B illustrate an example virtual sound source with respect to a listener, and an example corresponding delay module, respectively, according to some embodiments of the disclosure.

FIG. 4A illustrates an environment 400 including a user 402 and a virtual object (bee) 404 to the left of a median plane 406, according to some embodiments. A distance 410 from a right ear of the user 402 to the virtual bee 404 is greater than a distance 408 from a left ear of the user 402 to the virtual bee 404. As such, it should take sound from the virtual bee 404 longer to reach the right ear than the left ear.

Figure 4B:
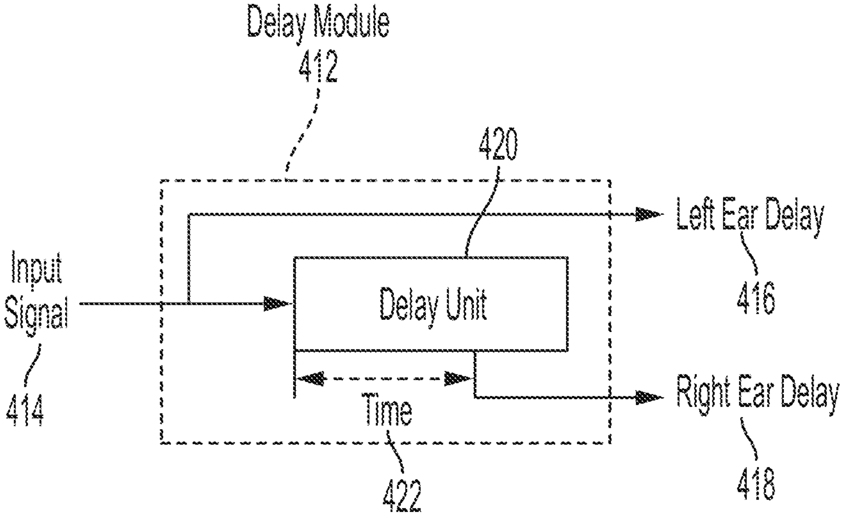

FIG. 4B illustrates a delay module 412 corresponding to the environment 400 of FIG. 4A, according to some embodiments. The delay module 412 may be used to implement delay module 105 shown in example system 100. As illustrated in FIG. 4B, the delay module 412 is in a first tap delay mode, and an input signal 414 is split to create a left ear delay 416. A delay unit 420 receives the input signal 414, delays the input signal 414 by time 422, and outputs a right ear delay 418. The left ear delay 416 is simply the input signal 414 and the right ear delay 418 is simply a delayed version of the input signal 414. The delay module 412 outputs the left ear delay 416 and the right ear delay 418.

Figure 5A:
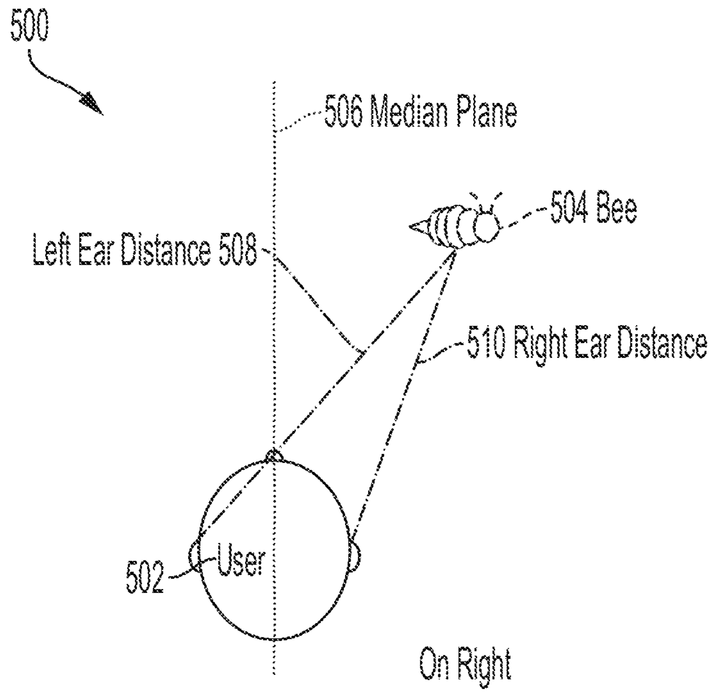
FIGS. 5A-5B illustrate an example virtual sound source with respect to a listener, and an example corresponding delay module, respectively, according to some embodiments of the disclosure.

FIG. 5A illustrates an environment 500 including a user 502 and a virtual object (bee) 504 to the right of a median plane 506, according to some embodiments. A distance 508 from a left ear of the user 502 to the virtual bee 504 is greater than a distance 510 from a right ear of the user 502 to the virtual bee 504. As such, it should take sound from the virtual bee 504 longer to reach the left ear than the right ear.

Figure 5B:
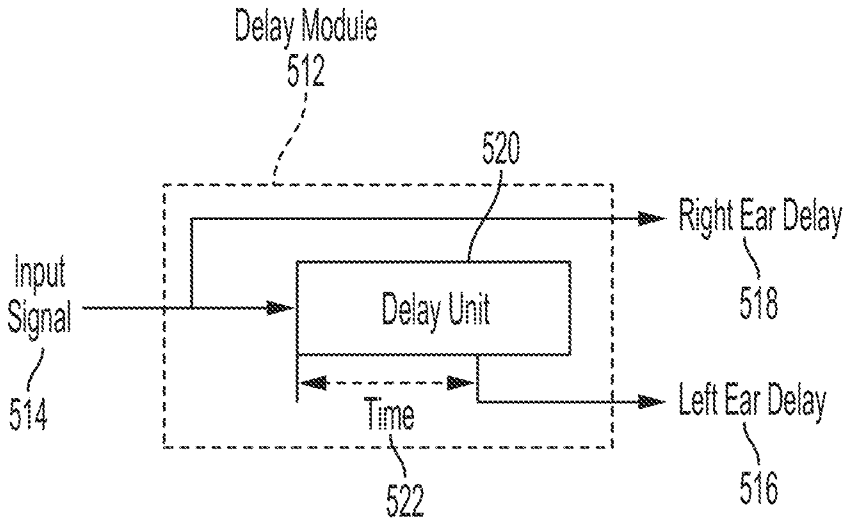

FIG. 5B illustrates a delay module 512 corresponding to the environment 500 of FIG. 5A, according to some embodiments. The delay module 512 may be used to implement delay module 105 shown in example system 100. As illustrated in FIG. 5B, the delay module 512 is in a one tap delay mode, and an input signal 514 is split to create a right ear delay 518. A delay unit 520 receives the input signal 514, delays the input signal 514 by time 522, and outputs a left ear delay 516. The right ear delay 518 is simply the input signal 514 and the left ear delay 516 is simply a delayed version of the input signal 514. The delay module 512 outputs the left ear delay 516 and the right ear delay 518.

In some embodiments, a direction of a virtual object in a soundscape changes with respect to a user. For example, the virtual object may move from a left side of the median plane to a right side of the median plane, from the right side of the median plane to left side of the median plane, from a first position on the right side of median plane to a second position on the right side of the median plane where the second position is closer to the median plane than the first position, from a first position on the right side of median plane to a second position on the right side of the median plane where the second position is farther from the median plane than the first position, from a first position on the left side of median plane to a second position on the left side of the median plane where the second position is closer to the median plane than the first position, from a first position on the left side of median plane to a second position on the left side of the median plane where the second position is farther from the median plane than the first position, from the right side of the median plane onto the median plane, from on the median plane to the right side of the median plane, from the left side of the median plane onto the median plane, and from the median plane to the left side of the median plane, to name a few.

In some embodiments, changes in the direction of the virtual object in the soundscape with respect to the user may require a change in an ITD (e.g., a difference between a left ear delay and a right ear delay).

In some embodiments, a delay module (e.g., delay module 105 shown in example system 100) may change the ITD by changing the left ear delay and/or the right ear delay instantaneously based on the change in the direction of the virtual object. However, changing the left ear delay and/or the right ear delay instantaneously may result in a sonic artifact. The sonic artifact may be, for example, a 'click' sound. It is desirable to minimize such sonic artifacts.

In some embodiments, a delay module (e.g., delay module 105 shown in example system 100) may change the ITD by changing the left ear delay and/or the right ear delay using ramping or smoothing of the value of the delay based on the change in the direction of the virtual object. However, changing the left ear delay and/or the right ear delay using ramping or smoothing of the value of the delay may result in a sonic artifact. The sonic artifact may be, for example, a change in pitch. It is desirable to minimize such sonic artifacts. In some embodiments, changing the left ear delay and/or the right ear delay using ramping or smoothing of the value of the delay may introduce latency, for example, due to time it takes to compute and execute ramping or smoothing and/or due to time it takes for a new sound to be delivered. It is desirable to minimize such latency.

In some embodiments, a delay module (e.g., delay module 105 shown in example system 100) may change an ITD by changing the left ear delay and/or the right early delay using cross-fading from a first delay to a subsequent delay. Cross-fading may reduce artifacts during transitioning between delay values, for example, by avoiding stretching or compressing a signal in a time domain. Stretching or compressing the signal in the time domain may result in a 'click' sound or pitch shifting as described above.

Figure 6A:
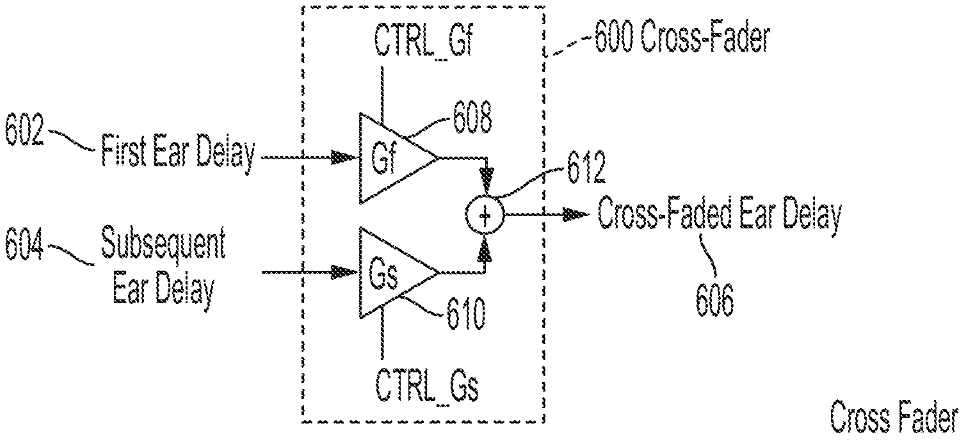
FIG. 6A illustrates an example cross-fader, according to some embodiments of the disclosure.

FIG. 6A illustrates a cross-fader 600, according to some embodiments. The cross-fader 600 may be used to implement delay module 105 shown in example system 100. The cross-fader 600 receives as input a first ear delay 602 and a subsequent ear delay 604, and outputs a cross-faded ear delay 606. The cross-fader 600 includes a first level fader (Gf) 608, a subsequent level fader (Gs) 610, and a summer 612. The first level fader 608 gradually decreases a level of the first ear delay based on a change in control signal CTRL Gf and the subsequent level fader 610 gradually increases a level of the subsequent ear delay based on a change in control signal CTRL_Gs. The summer 612 sums the outputs of the first level fader 608 and the subsequent level fader 612.

Figure 6B:
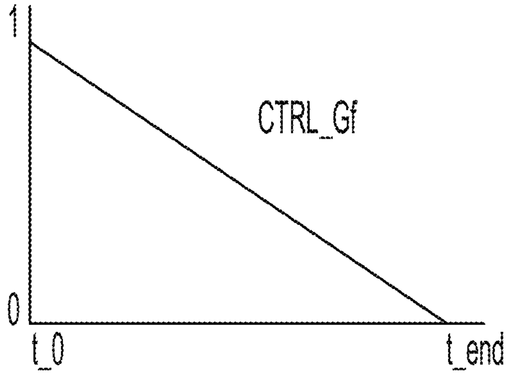
FIGS. 6B-6C illustrate example control signals for a cross-fader, according to some embodiments of the disclosure.

FIG. 6B illustrates a model of a control signal CTRL Gf, according to some embodiments. In the example shown, the value of the control signal CTRL Gf decreases from unity to zero over a period of time (e.g., unity at time t 0 and zero at time t end). In some embodiments, the value of the control signal CTRL Gf may decrease linearly, exponentially, or some other functions, from unity to zero.

Figure 6C:
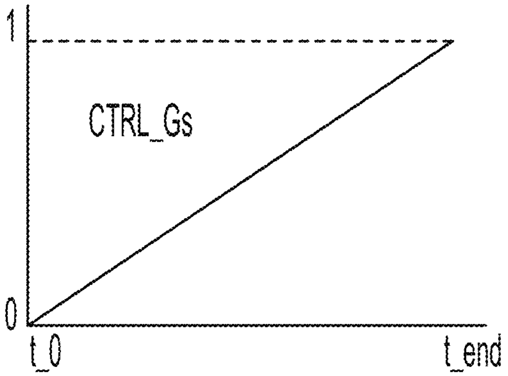

FIG. 6C illustrates a model of a control signal CTRL_Gs, according to some embodiments. In the example shown, the value of the control signal CTRL_Gs increases from zero to unity over a period of time (e.g., zero at time t 0 and unity at time t end). In some embodiments, the value of the control signal CTRL_Gs may increase linearly, exponentially, or some other functions, from zero to unity.

Figure 7A:
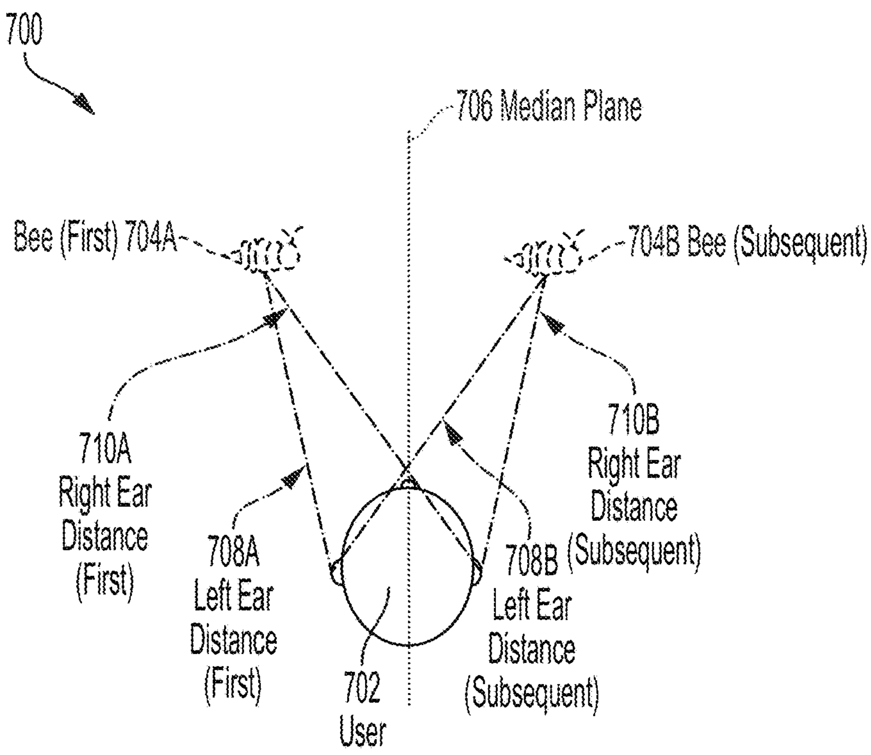
FIGS. 7A-7B illustrate an example virtual sound source with respect to a listener, and an example corresponding delay module including cross-faders, respectively, according to some embodiments of the disclosure.

FIG. 7A illustrates an environment 700 including a user 702 and a virtual object (bee) 704A to the left of a median plane 706 at a first time and a virtual object (bee) 704B to the right of the median plane 706 at a subsequent time, according to some embodiments. At the first time, a distance 710A from a virtual bee 704A to a right ear of the user 702 is greater than a distance 708A from a virtual bee 704A to a left ear of the user 702. As such, at the first time, it should take sound from the virtual bee 704A longer to reach the right ear than the left ear. At the subsequent time, a distance 708B from the virtual bee 704B to the left ear is greater than a distance 710B from the virtual bee 704B to the right ear. As such, at the subsequent time, it should take sound from the virtual bee 704B longer to reach the left ear than the right ear.

Figure 7B:
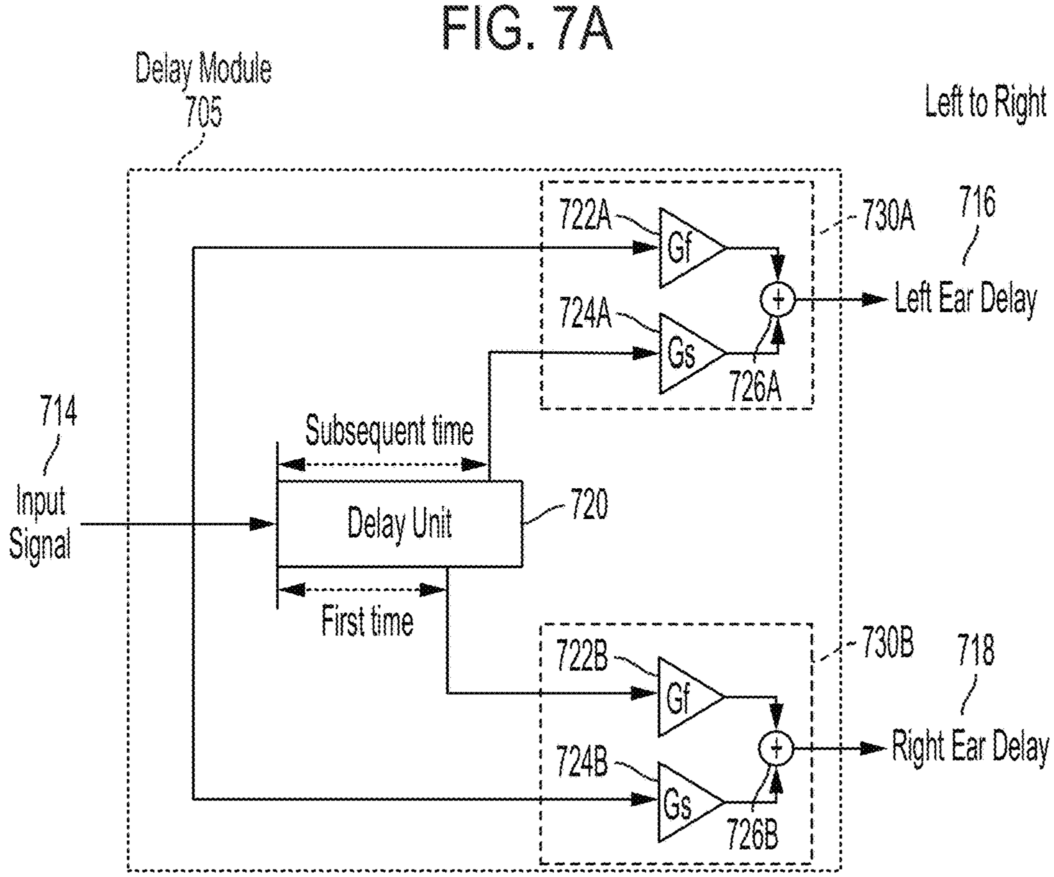

FIG. 7B illustrates a delay module 712 corresponding to the environment 700 of FIG. 7A, according to some embodiments. The delay module 712 may be used to implement delay module 105 shown in example system 100. The delay module 712 receives an input signal 714 and outputs a left ear delay 716 and a right ear delay 718. The delay module 712 includes a delay unit 720 and two cross-faders: a left cross-fader 730A and a right cross-fader 730B. The left cross-fader 730A includes a first level fader (Gf) 722A, a subsequent level fader (Gs) 724A, and a summer 726A. The right cross-level fader 730B includes a first level fader (Gf) 722B, a subsequent level fader (Gs) 724B, and a summer 726B.

At the first time the distance 710A is greater than the distance 708A. For the first time, the input signal 714 is supplied directly to the first level fader 722A, and the delay unit 720 delays the input signal 714 by a first time and supplies the input signal 714 delayed by the first time to the first level fader 722B.

At the subsequent time the distance 708B is greater than the distance 710A. For the subsequent time, the input signal 714 is supplied directly to the subsequent level fader 724B, and the delay unit 720 delays the input signal 714 by a subsequent time and supplies the input signal 714 delayed by the subsequent time to the subsequent level fader 724A.

The summer 726A sums the output of the first level fader 722A and the subsequent level fader 724A to create the left ear delay 716, and the summer 726B sums the outputs of the first level fader 722B and the subsequent level fader 724B to create the right ear delay 718.

Thus, the left cross-fader 730A cross-fades between the input signal 714 and the input signal 714 delayed by the subsequent time, and the right cross-fader 730B cross-fades between the input signal 714 delayed by the first time and the input signal 714.

Figure 8A:
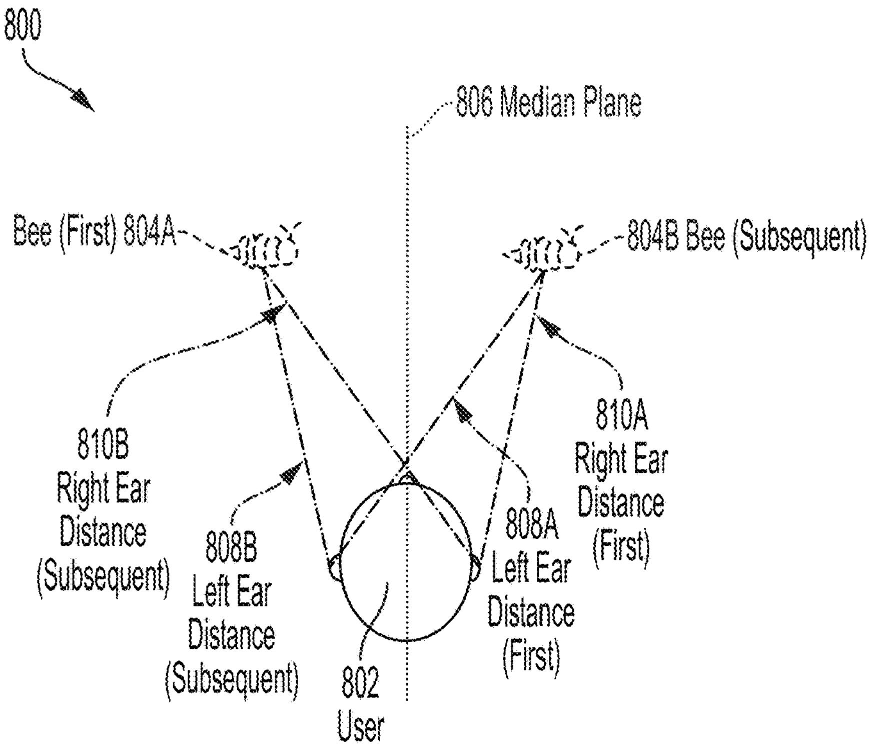
FIGS. 8A-8B illustrate an example virtual sound source with respect to a listener, and an example corresponding delay module including cross-faders, respectively, according to some embodiments of the disclosure.

FIG. 8A illustrates an environment 800 including a user 802 and a virtual object (bee) 804A to the right of a median plane 806 at a first time and a virtual object (bee) 804B to the left of the median plane 806 at a subsequent time, according to some embodiments. At the first time, a distance 808A from the virtual bee 808A to a left ear of the user 802 is greater than a distance 810A from virtual bee 804A to a right ear of the user 802. As such, at the first time, it should take sound from the virtual bee 804A longer to reach the left ear than the right ear. At the subsequent time, a distance 810B from the virtual bee 804B to the right ear is greater than a distance 808B from the virtual bee 804B to the left ear. As such, at the subsequent time, it should take sound from the virtual bee 804B longer to reach the right ear than the left ear.

Figure 8B:
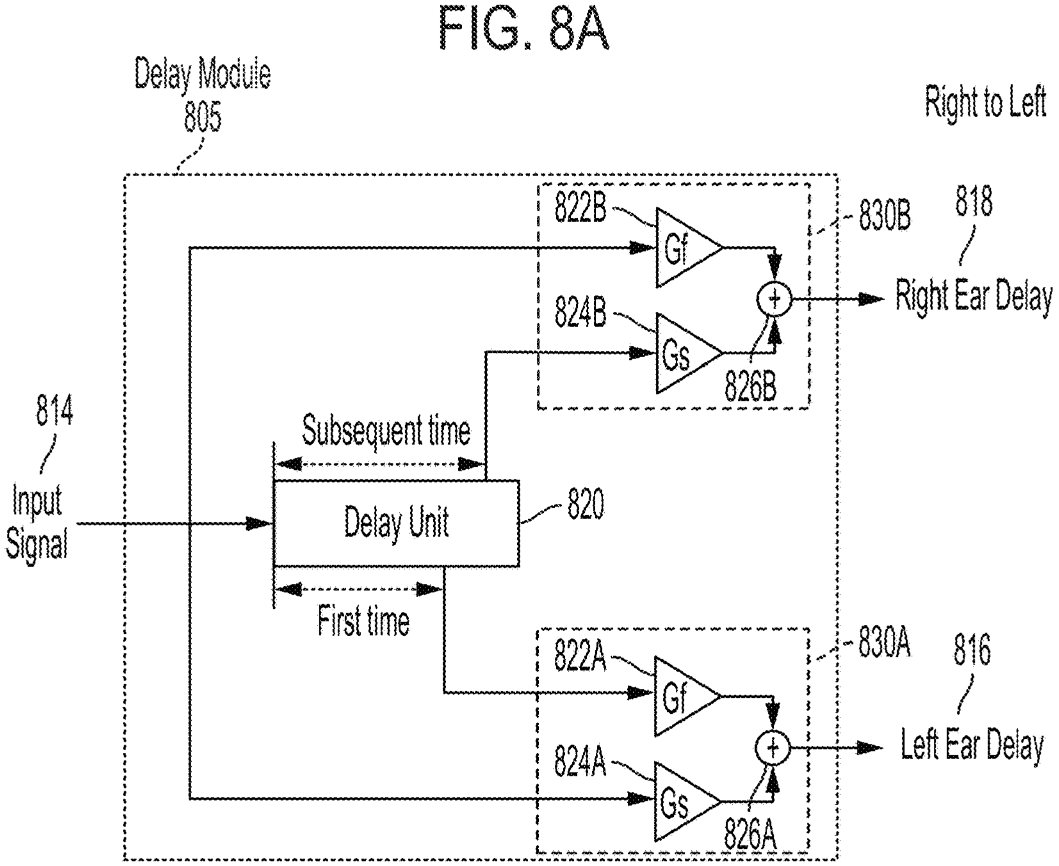

FIG. 8B illustrates a delay module 812 corresponding to the environment 800 of FIG. 8A, according to some embodiments. The delay module 812 may be used to implement delay module 105 shown in example system 100. The delay module 812 receives an input signal 814 and outputs a left ear delay 816 and a right ear delay 818. The delay module 812 includes a delay unit 820 and two cross-faders: a left cross-fader 830A and a right cross-fader 830B. The left cross-fader 830A includes a first level fader (Gf) 822A, a subsequent level fader (Gs) 824A, and a summer 826A. The right cross-level fader 830B includes a first level fader (Gf) 822B, a subsequent level fader (Gs) 824B, and a summer 826B.

At the first time the distance 808A is greater than the distance 810A. For the first time, the input signal 814 is supplied directly to the first level fader 822B, and the delay unit 820 delays the input signal 814 by a first time and supplies the input signal 814 delayed by the first time to the first level fader 822A.

At the subsequent time the distance 810B is greater than the distance 808B. For the subsequent time, the input signal 814 is supplied directly to the subsequent level fader 824A, and the delay unit 820 delays the input signal 814 by a subsequent time and supplies the input signal 814 delayed by the subsequent time to the subsequent level fader 824B.

The summer 826A sums the output of the first level fader 822A and the subsequent level fader 824A to create the left ear delay 816, and the summer 826B sums the outputs of the first level fader 822B and the subsequent level fader 824B to create the right ear delay 818.

Thus, the left cross-fader 830A cross-fades between the input signal 814 delayed by the first time and the input signal 814, and the right cross-fader 830B cross-fades between the input signal 814 and the input signal 814 delayed by the subsequent time.

Figure 9A:
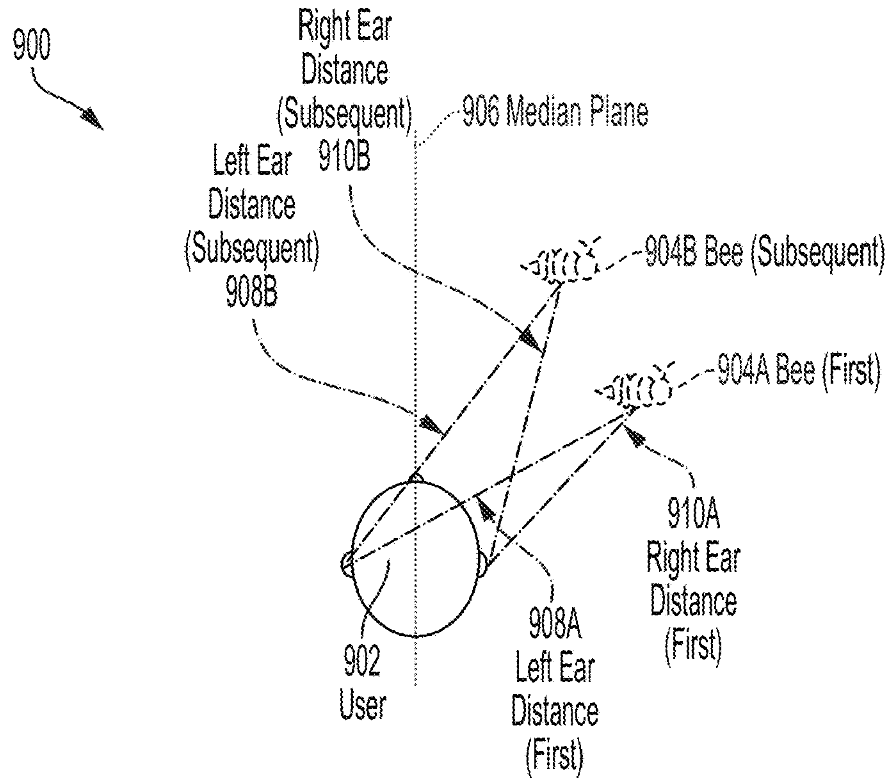
FIGS. 9A-9B illustrate an example virtual sound source with respect to a listener, and an example corresponding delay module including a cross-fader, respectively, according to some embodiments of the disclosure.

FIG. 9A illustrates an environment 900 including a user 902 and a virtual object (bee) 904A very right of a median plane 906 at a first time and a virtual object (bee) 904B less right of the median plane 906 (e.g., closer to the median plane 906) at a subsequent time, according to some embodiments. At the first time, a distance 908A from the virtual bee 904A to a left ear of the user 902 is greater than a distance 910A from the virtual bee 904A to a right ear of the user 902. As such, at the first time, it should take sound from the virtual bee 904A longer to reach the left ear than the right ear. At the subsequent time, a distance 908B from the virtual bee 904B to the left ear is greater than a distance 910B from the virtual bee 904B to the right ear. As such, at the subsequent time, it should take sound from the virtual bee 904B longer to reach the left ear than the right ear. Comparing the distances 908A and 908B, it should take sound from the virtual bee 904A at the first time longer to reach the left ear than sound from the virtual bee 904B at the subsequent time since the distance 908A is greater than the distance 908B. Comparing the distances 910A and 910B, it should take sound from the virtual bee 904A at the first time the same time to reach the right ear as sound from the virtual bee 904B at the subsequent time.

Figure 9B:
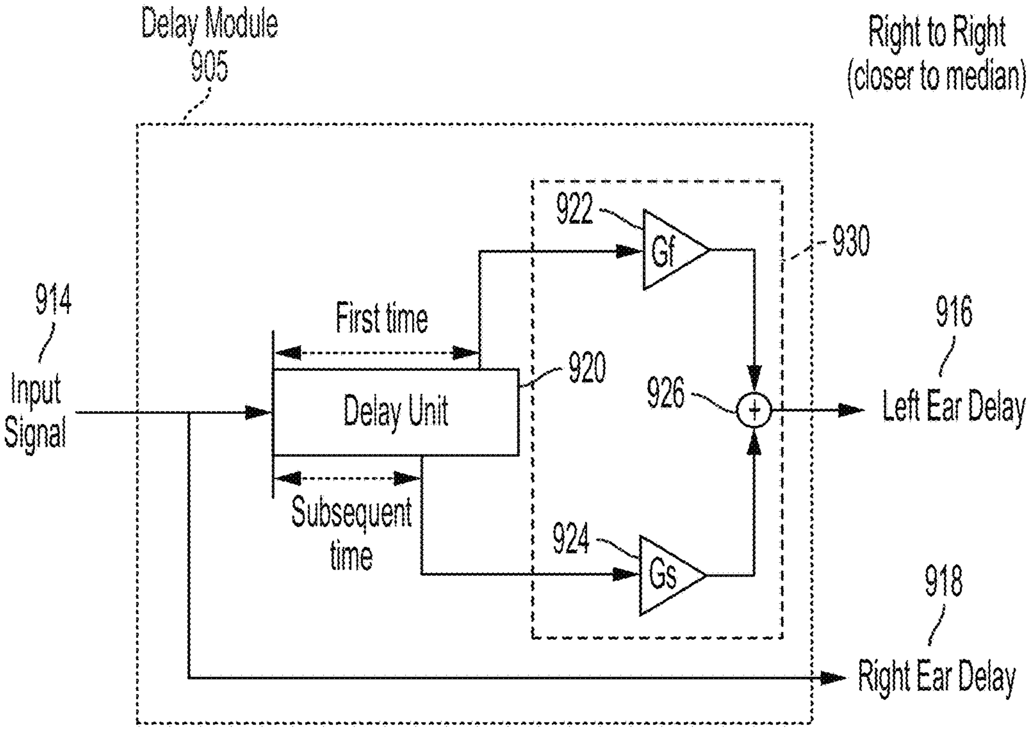

FIG. 9B illustrates a delay module 912 corresponding to the environment 900 of FIG. 9A, according to some embodiments. The delay module 912 may be used to implement delay module 105 shown in example system 100. The delay module 912 receives an input signal 914 and outputs a left ear delay 916 and a right ear delay 918. The delay module 912 includes a delay unit 920 and a left cross-fader 930. The left cross-fader 930 includes a first level fader (Gf) 922, a subsequent level fader (Gs) 924, and a summer 926.

At the first time the distance 908A is greater than the distance 910A. For the first time, the input signal 914 is supplied directly to the right ear delay 918, and the delay unit 920 delays the input signal 914 by a first time and supplies the input signal 914 delayed by the first time to the first level fader 922.

At the subsequent time the distance 908B is greater than the distance 910B, and the distance 908B is less than the distance 908A. For the subsequent time, the input signal 914 is supplied directly to the right ear delay 918, and the delay unit 920 delays the input signal 914 by a subsequent time and supplies the input signal 914 delayed by the subsequent time to the subsequent level fader 924.

The input signal 914 delayed by the first time may be more delayed than the input signal 914 delayed by the subsequent time because the distance 908A is greater than the distance 908B.

The summer 926 sums the output of the first level fader 922 and the subsequent level fader 924 to create the left ear delay 916.

Thus, the left cross-fader 930 cross-fades between the input signal 914 delayed by the first time and the input signal 914 delayed by the subsequent time.

Figure 10A:
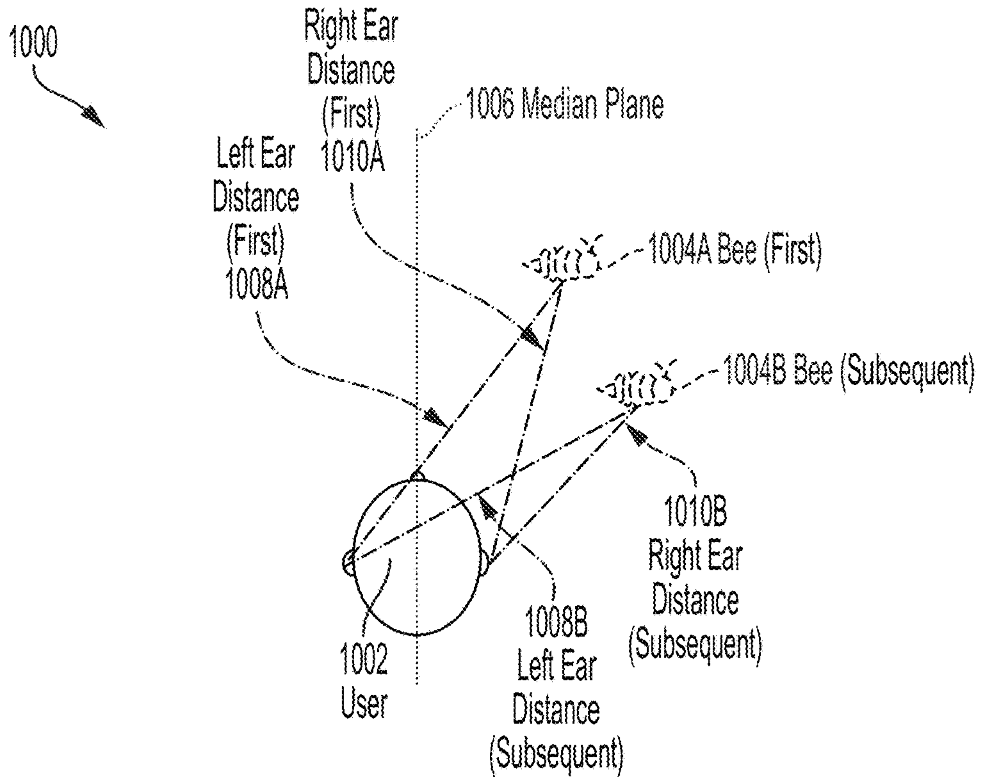
FIGS. 10A-10B illustrate an example virtual sound source with respect to a listener, and an example corresponding delay module including a cross-fader, respectively, according to some embodiments of the disclosure.

FIG. 10A illustrates an environment 1000 including a user 1002 and a virtual object (bee) 1004A right of a median plane 1006 at a first time and a virtual object (bee) 1004B more right of the median plane 1006 (e.g., farther from the median plane 1006) at a subsequent time, according to some embodiments. At the first time, a distance 1008A from the virtual bee 1004A to a left ear of the user 1002 is greater than a distance 1010A from the virtual bee 1004A to a right ear of the user 1002. As such, at the first time, it should take sound from the virtual bee 1004A longer to reach the left ear than the right ear. At the subsequent time, a distance 1008B from the virtual bee 1004B to the left ear is greater than a distance 1010B from the virtual bee 1004B to the right ear. As such, at the subsequent time, it should take sound from the virtual bee 1004B longer to reach the left ear than the right ear. Comparing the distances 1008A and 1008B, it should take sound from the virtual bee 1004B at the subsequent time longer to reach the left ear than sound from the virtual bee 1004A at the first time since the distance 1008B is greater than the distance 1008A. Comparing the distances 1010A and 1010B, it should take sound from the virtual bee 1004A at the first time the same time to reach the right ear as sound from the virtual bee 1004B at the subsequent time.

Figure 10B:
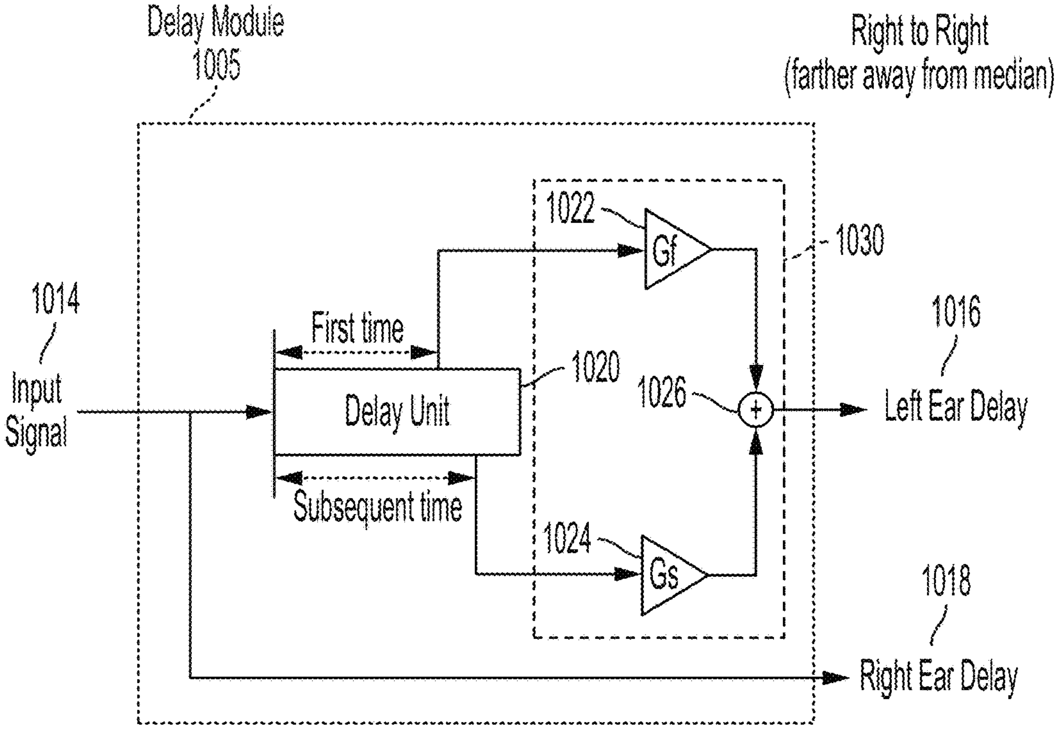

FIG. 10B illustrates a delay module 1012 corresponding to the environment 1000 of FIG. 10A, according to some embodiments. The delay module 1012 may be used to implement delay module 105 shown in example system 100. The delay module 1012 receives an input signal 1014 and outputs a left ear delay 1016 and a right ear delay 1018. The delay module 1012 includes a delay unit 1020 and a left cross-fader 1030. The left cross-fader 1030 includes a first level fader (Gf) 1022, a subsequent level fader (Gs) 1024, and a summer 1026.

At the first time the distance 1008A is greater than the distance 1010A. For the first time, the input signal 1014 is supplied directly to the right ear delay 1018, and the delay unit 1020 delays the input signal 1014 by a first time and supplies the input signal 1014 delayed by the first time to the first level fader 1022.

At the subsequent time the distance 1008B is greater than the distance 1010B, and the distance 1008B is greater than the distance 1008A. For the subsequent time, the input signal 1014 is supplied directly to the right ear delay 1018, and the delay unit 1020 delays the input signal 1014 by a subsequent time and supplies the input signal 1014 delayed by the subsequent time to the subsequent level fader 1024.

The input signal 1014 delayed by the first time may be less delayed than the input signal 1014 delayed by the subsequent time because the distance 1008A is less than the distance 1008B.

The summer 1026 sums the output of the first level fader 1022 and the subsequent level fader 1024 to create the left ear delay 1016.

Thus, the left cross-fader 1030 cross-fades between the input signal 1014 delayed by the first time and the input signal 1014 delayed by the subsequent time.

Figure 11A:
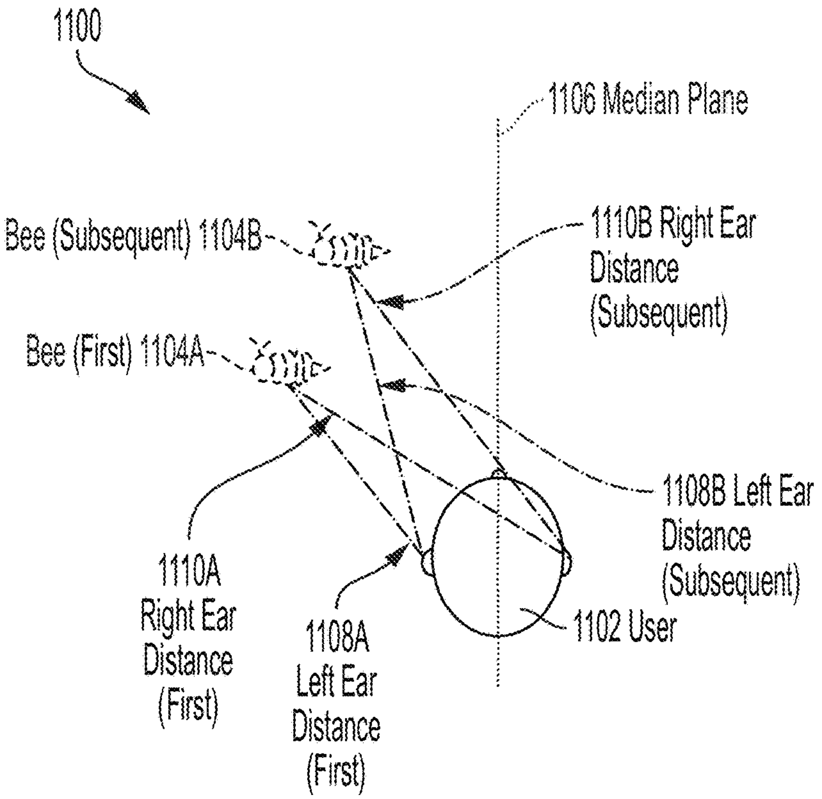
FIGS. 11A-11B illustrate an example virtual sound source with respect to a listener, and an example corresponding delay module including a cross-fader, respectively, according to some embodiments of the disclosure.

FIG. 11A illustrates an environment 1100 including a user 1102 and a virtual object (bee) 1104A very right of a median plane 1106 at a first time and a virtual object (bee) 1104B less right of the median plane 1106 (e.g., closer to the median plane 1106) at a subsequent time, according to some embodiments. At the first time, a distance 1110A from the virtual bee 1104A to a right ear of the user 1102 is greater than a distance 1108A from the virtual bee 1104A to a left ear of the user 1102. As such, at the first time, it should take sound from the virtual bee 1104A longer to reach the right ear than the left ear. At the subsequent time, a distance 1110B from the virtual bee 1104B to the right ear is greater than a distance 1108B from the virtual bee 1104B to the left ear. As such, at the subsequent time, it should take sound from the virtual bee 1104B longer to reach the right ear than the left ear. Comparing the distances 1110A and 1110B, it should take sound from the virtual bee 1104A at the first time longer to reach the right ear than sound from the virtual bee 1104B at the subsequent time since the distance 1110A is greater than the distance 1110B. Comparing the distances 1108A and 1108B, it should take sound from the virtual bee 1104A at the first time the same time to reach the left ear as sound from the virtual bee 1104B at the subsequent time.

Figure 11B:
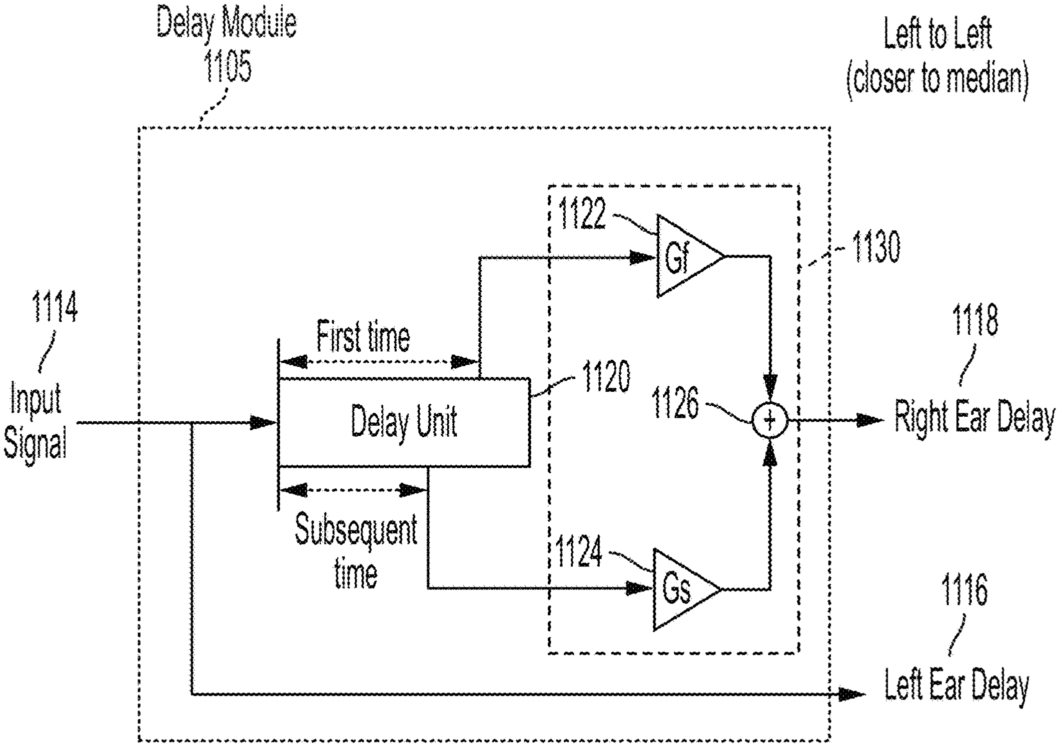

FIG. 11B illustrates a delay module 1112 corresponding to the environment 1100 of FIG. 11A, according to some embodiments. The delay module 1112 may be used to implement delay module 105 shown in example system 100. The delay module 1112 receives an input signal 1114 and outputs a left ear delay 1116 and a right ear delay 1118. The delay module 1112 includes a delay unit 1120 and a right cross-fader 1130. The right cross-fader 1130 includes a first level fader (Gf) 1122, a subsequent level fader (Gs) 1124, and a summer 1126.

At the first time the distance 1110A is greater than the distance 1108A. For the first time, the input signal 1114 is supplied directly to the left ear delay 1116, and the delay unit 1120 delays the input signal 1114 by a first time and supplies the input signal 1114 delayed by the first time to the first level fader 1122.

At the subsequent time the distance 1110B is greater than the distance 1108A, and the distance 1110B is less than the distance 1110A. For the subsequent time, the input signal 1114 is supplied directly to the left ear delay 1116, and the delay unit 1120 delays the input signal 1114 by a subsequent time and supplies the input signal 1114 delayed by the subsequent time to the subsequent level fader 1124.

The input signal 1114 delayed by the first time may be more delayed than the input signal 1114 delayed by the subsequent time because the distance 1110A is greater than the distance 1110B.

The summer 1126 sums the output of the first level fader 1122 and the subsequent level fader 1124 to create the left ear delay 1116.

Thus, the right cross-fader 1130 cross-fades between the input signal 1114 delayed by the first time and the input signal 1114 delayed by the subsequent time.

Figure 12A:
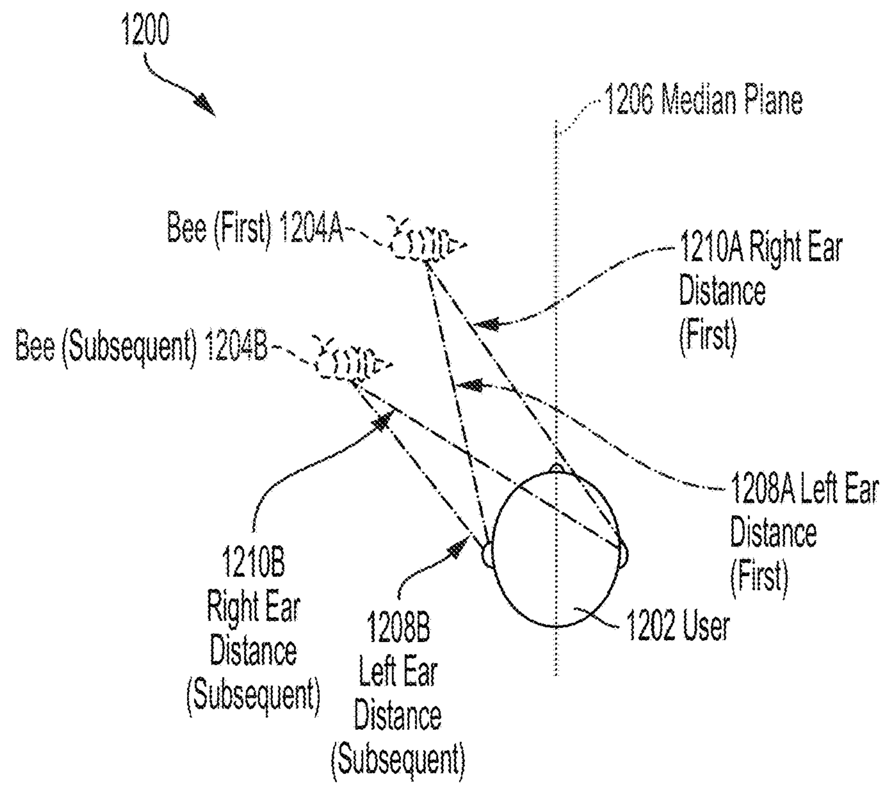
FIGS. 12A-12B illustrate an example virtual sound source with respect to a listener, and an example corresponding delay module including a cross-fader, respectively, according to some embodiments of the disclosure.

FIG. 12A illustrates an environment 1200 including a user 1202 and a virtual object (bee) 1204A left of a median plane 1206 at a first time and a virtual object (bee) 1204B more left of the median plane 1206 (e.g., farther from the median plane 1206) at a subsequent time, according to some embodiments. At the first time, a distance 1210A from the virtual bee 1204A to a right ear of the user 1202 is greater than a distance 1208A from the virtual bee 1204A to a left ear of the user 1202. As such, at the first time, it should take sound from the virtual bee 1204A longer to reach the right ear than the left ear. At the subsequent time, a distance 1210B from the virtual bee 1204B to the right ear is greater than a distance 1208A from the virtual bee 1204B to the left ear. As such, at the subsequent time, it should take sound from the virtual bee 1204B longer to reach the right ear than the left ear. Comparing the distances 1210A and 1210B, it should take sound from the virtual bee 1204B at the subsequent time longer to reach the right ear than sound from the virtual bee 1204A at the first time since the distance 1210B is greater than the distance 1210A. Comparing the distances 1208A and 1208B, it should take sound from the virtual bee 1204A at the first time the same time to reach the left ear as sound from the virtual bee 1204B at the subsequent time.

Figure 12B:
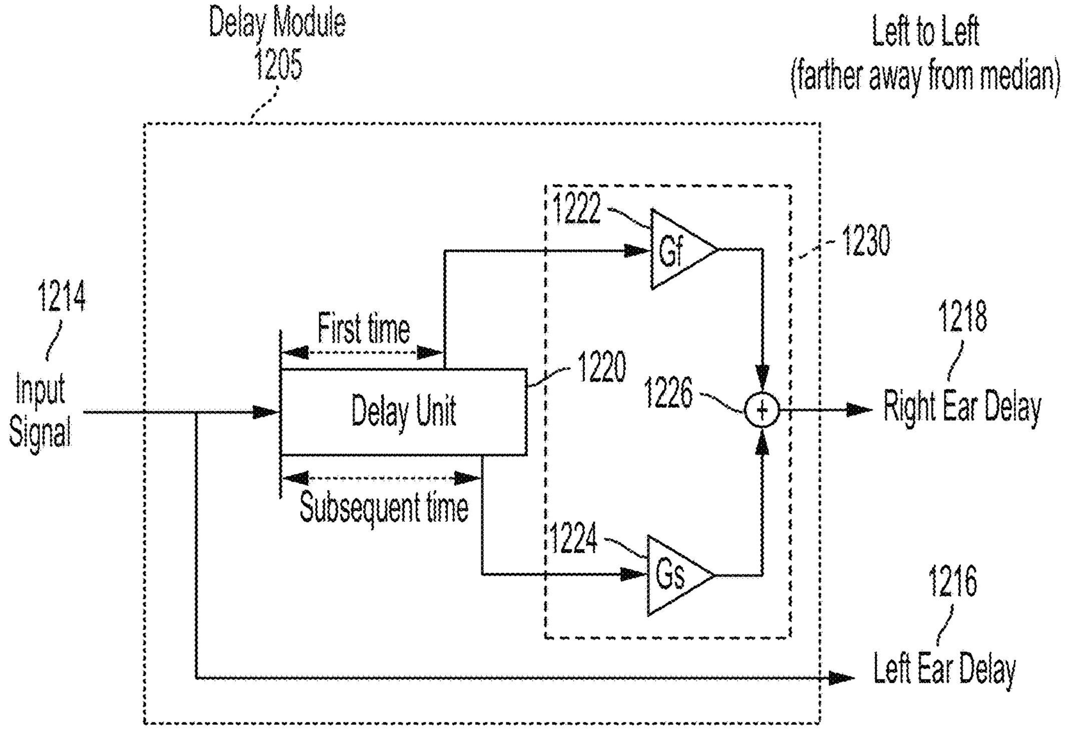

FIG. 12B illustrates a delay module 1212 corresponding to the environment 1200 of FIG. 12A, according to some embodiments. The delay module 1212 may be used to implement delay module 105 shown in example system 100. The delay module 1212 receives an input signal 1214 and outputs a left ear delay 1216 and a right ear delay 1218. The delay module 1212 includes a delay unit 1220 and a right cross-fader 1230. The right cross-fader 1230 includes a first level fader (Gf) 1222, a subsequent level fader (Gs) 1224, and a summer 1226.

At the first time the distance 1210A is greater than the distance 1208A. For the first time, the input signal 1214 is supplied directly to the left ear delay 1216, and the delay unit 1220 delays the input signal 1214 by a first time and supplies the input signal 1214 delayed by the first time to the first level fader 1222.

At the subsequent time the distance 1210B is greater than the distance 1208B, and the distance 1210B is greater than the distance 1210A. For the subsequent time, the input signal 1214 is supplied directly to the left ear delay 1216, and the delay unit 1220 delays the input signal 1214 by a subsequent time and supplies the input signal 1214 delayed by the subsequent time to the subsequent level fader 1224.

The input signal 1214 delayed by the first time may be less delayed than the input signal 1214 delayed by the subsequent time because the distance 1210A is less than the distance 1210B.

The summer 1226 sums the output of the first level fader 1222 and the subsequent level fader 1224 to create the right ear delay 1216.

Thus, the left cross-fader 1230 cross-fades between the input signal 1214 delayed by the first time and the input signal 1214 delayed by the subsequent time.

Figure 13A:
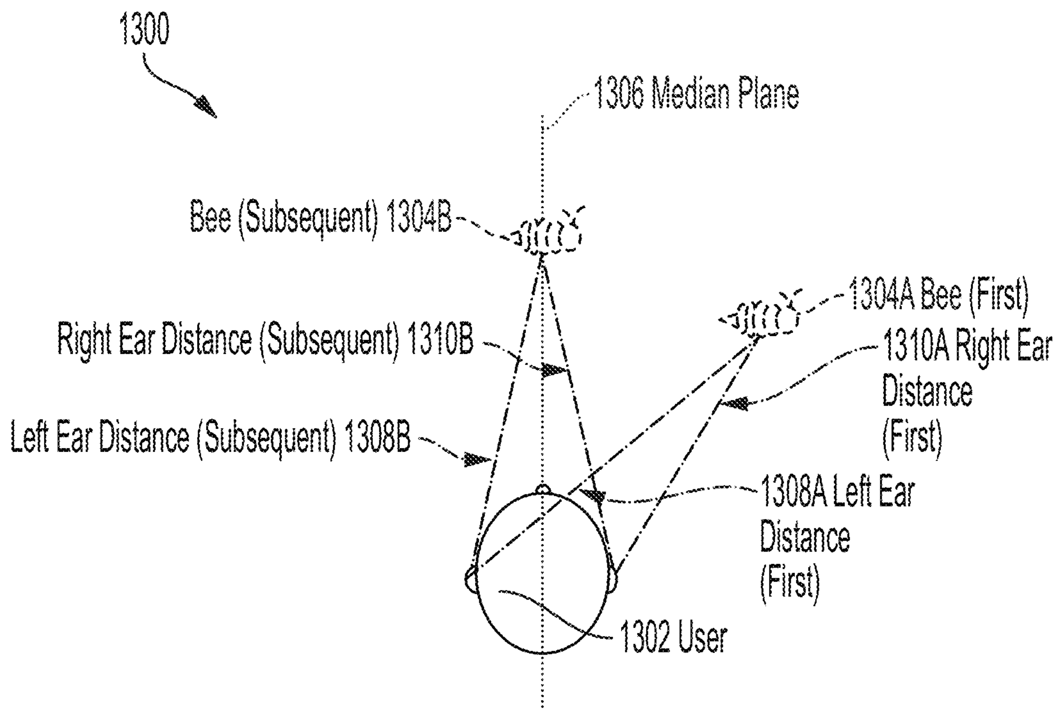
FIGS. 13A-13B illustrate an example virtual sound source with respect to a listener, and an example corresponding delay module including a cross-fader, respectively, according to some embodiments of the disclosure.

FIG. 13A illustrates an environment 1300 including a user 1302 and a virtual object (bee) 1304A right of a median plane 1306 at a first time and a virtual object (bee) 1304B on the median plane 1306 at a subsequent time, according to some embodiments. At the first time, a distance 1308A from the virtual bee 1304A to a left ear of the user 1302 is greater than a distance 1310A from the virtual bee 1304A to a right ear of the user 1302. As such, at the first time, it should take sound from the virtual bee 1304A longer to reach the left ear than the right ear. At the subsequent time, a distance 1308B from the virtual bee 1304B to the left ear is the same as a distance 1310B from the virtual bee 1304B to the right ear. As such, at the subsequent time, it should take sound from the virtual bee 1304B the same time to reach the left ear than the right ear. Comparing the distances 1308A and 1308B, it should take sound from the virtual bee 1304A at the first time longer to reach the left ear than sound from the virtual bee 1304B at the subsequent time since the distance 1308A is greater than the distance 1308B. Comparing the distances 1310A and 1310B, it should take sound from the virtual bee 1304A at the first time the same time to reach the right ear as sound from the virtual bee 1304B at the subsequent time.

Figure 13B:
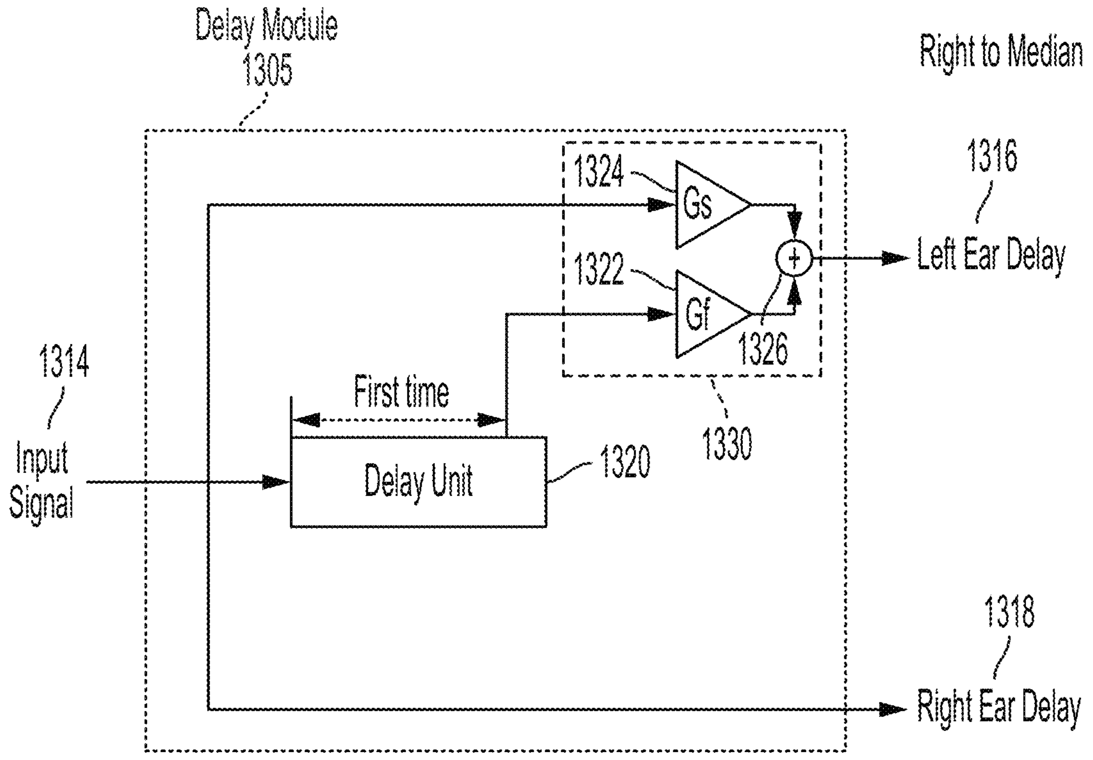

FIG. 13B illustrates a delay module 1312 corresponding to the environment 1300 of FIG. 13A, according to some embodiments. The delay module 1312 may be used to implement delay module 105 shown in example system 100. The delay module 1312 receives an input signal 1314 and outputs a left ear delay 1316 and a right ear delay 1318. The delay module 1312 includes a delay unit 1320 and a left cross-fader 1330. The left cross-fader 1330 includes a first level fader (Gf) 1322, a subsequent level fader (Gs) 1324, and a summer 1326.

At the first time the distance 1308A is greater than the distance 1310A. For the first time, the input signal 1314 is supplied directly to the right ear delay 1318, and the delay unit 1320 delays the input signal 1314 by a first time and supplies the input signal 1314 delayed by the first time to the first level fader 1322.

At the subsequent time the distance 1308B is the same as the distance 1310B, and the distance 1308B is less than the distance 1308A. For the subsequent time, the input signal 1314 is supplied directly to the right ear delay 1318, and the input signal 1314 is supplied directly to the subsequent level fader 1324.

The summer 1326 sums the output of the first level fader 1322 and the subsequent level fader 1324 to create the left ear delay 1316.

Thus, the left cross-fader 1330 cross-fades between the input signal 1314 delayed by the first time and the input signal 1314.

Figure 14A:
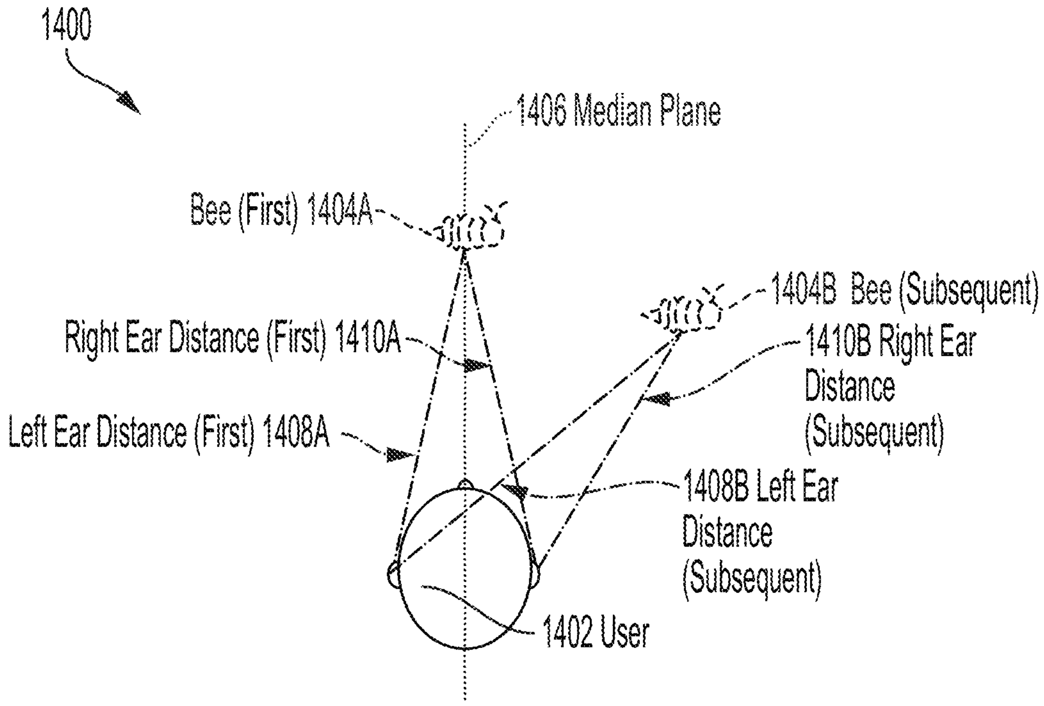
FIGS. 14A-14B illustrate an example virtual sound source with respect to a listener, and an example corresponding delay module including a cross-fader, respectively, according to some embodiments of the disclosure.

FIG. 14A illustrates an environment 1400 including a user 1402 and a virtual object (bee) 1404A on a median plane 1406 at a first time and a virtual object (bee) 1404B right of the median plane 1406 at a subsequent time, according to some embodiments. At the first time, a distance 1408A from the virtual bee 1404A to a left ear of the user 1402 is the same as a distance 1410A from the virtual bee 1404A to a right ear of the user 1402. As such, at the first time, it should take sound from the virtual bee 1404A the same time to reach the left ear than the right ear. At the subsequent time, a distance 1408B from the virtual bee 1404B to the left ear is greater than a distance 1410A from to the virtual bee 1404A to the right ear. As such, at the subsequent time, it should take sound from the virtual bee 1404B longer to reach the left ear than the right ear. Comparing the distances 1408A and 1408B, it should take sound from the virtual bee 1404B at the subsequent time longer to reach the left ear than sound from the virtual bee 1404A at the first time since the distance 1408B is greater than the distance 1408A. Comparing the distances 1410A and 1410B, it should take sound from the virtual bee 1404A at the first time the same time to reach the right ear as sound from the virtual bee 1404B at the subsequent time.

Figure 14B:
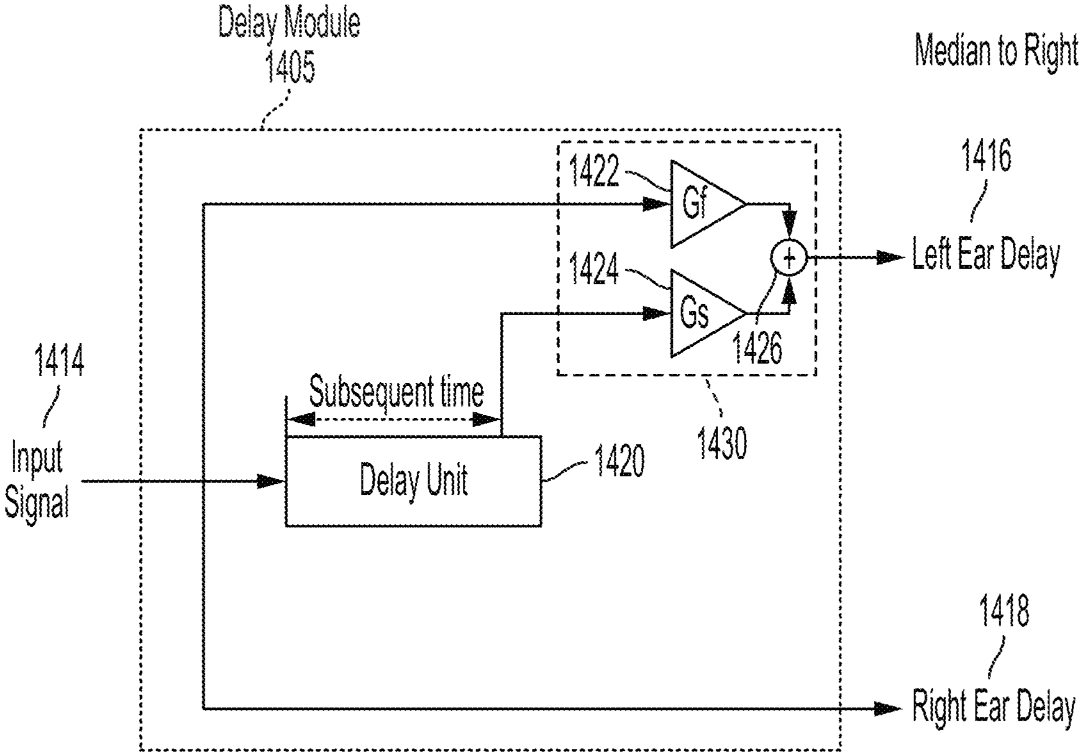

FIG. 14B illustrates a delay module 1412 corresponding to the environment 1400 of FIG. 14A, according to some embodiments. The delay module 1412 may be used to implement delay module 105 shown in example system 100. The delay module 1412 receives an input signal 1414 and outputs a left ear delay 1416 and a right ear delay 1418. The delay module 1412 includes a delay unit 1420 and a left cross-fader 1430. The left cross-fader 1430 includes a first level fader (Gf) 1422, a subsequent level fader (Gs) 1424, and a summer 1426.

At the first time the distance 1408A is the same as the distance 1410A. For the first time, the input signal 1414 is supplied directly to the right ear delay 1418, and the input signal 1414 is supplied directly to the first level fader 1422.

At the subsequent time the distance 1408B is greater than the distance 1410B. For the subsequent time, the input signal 1414 is supplied directly to the right ear delay 1418, and the delay unit 1420 delays the input signal 1414 by a subsequent time and supplies the input signal 1414 delayed by the subsequent time to the subsequent level fader 1424.

The summer 1426 sums the output of the first level fader 1422 and the subsequent level fader 1424 to create the left ear delay 1416.

Thus, the left cross-fader 1430 cross-fades between the input signal 1414 and the input signal 1414 delayed by the subsequent time.

Figure 15A:
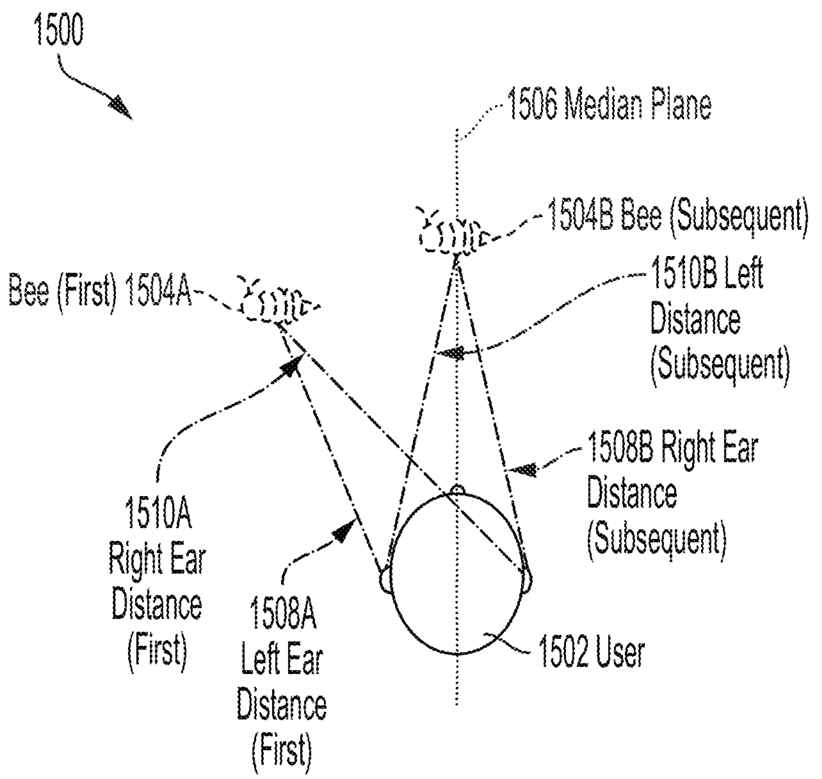
FIGS. 15A-15B illustrate an example virtual sound source with respect to a listener, and an example corresponding delay module including a cross-fader, respectively, according to some embodiments of the disclosure.

FIG. 15A illustrates an environment 1500 including a user 1502 and a virtual object (bee) 1504A left of a median plane 1506 at a first time and a virtual object (bee) 1504B on the median plane 1506 at a subsequent time, according to some embodiments. At the first time, a distance 1510A from the virtual bee 1504A to a right ear of the user 1502 is greater than a distance 1508A from the virtual bee 1504A to a left ear of the user 1502. As such, at the first time, it should take sound from the virtual bee 1504A longer to reach the right ear than the left ear. At the subsequent time, a distance 1508B from the virtual bee 1504B to the left ear is the same as a distance 1510B from the virtual bee 1504B to the right ear. As such, at the subsequent time, it should take sound from the virtual bee 1504B the same time to reach the left ear than the right ear. Comparing the distances 1510A and 1510, it should take sound from the virtual bee 1504A at the first time longer to reach the right ear than sound from the virtual bee 1504B at the subsequent time since the distance 1510A is greater than the distance 1510B. Comparing the distances 1508A and 1508B, it should take sound from the virtual bee 1504A at the first time the same time to reach the left ear as sound from the virtual bee 1504B at the subsequent time.

Figure 15B:
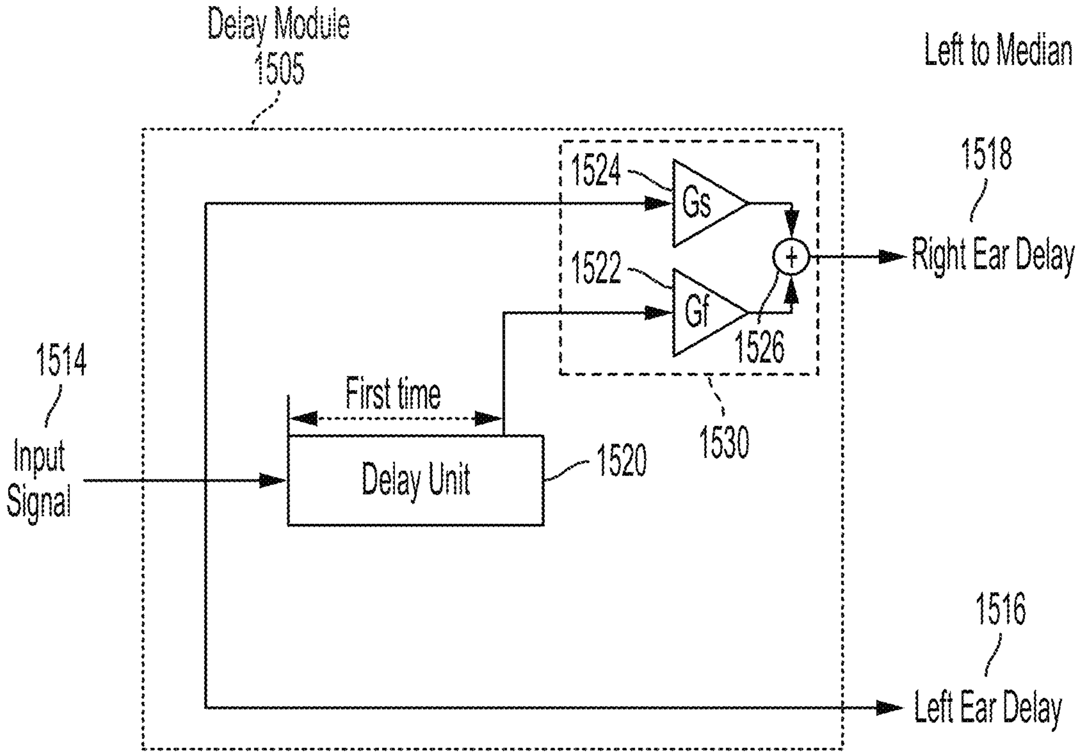

FIG. 15B illustrates a delay module 1512 corresponding to the environment 1500 of FIG. 15A, according to some embodiments. The delay module 1512 may be used to implement delay module 105 shown in example system 100. The delay module 1512 receives an input signal 1514 and outputs a left ear delay 1516 and a right ear delay 1518. The delay module 1512 includes a delay unit 1520 and a right cross-fader 1530. The right cross-fader 1530 includes a first level fader (Gf) 1522, a subsequent level fader (Gs) 1524, and a summer 1526.

At the first time the distance 1510A is greater than the distance 1508A. For the first time, the input signal 1514 is supplied directly to the left ear delay 1516, and the delay unit 1520 delays the input signal 1514 by a first time and supplies the input signal 1514 delayed by the first time to the first level fader 1522.

At the subsequent time the distance 1508B is the same as the distance 1510B, and the distance 1510B is less than the distance 1510A. For the subsequent time, the input signal 1514 is supplied directly to the left ear delay 1516, and the input signal 1514 is supplied directly to the subsequent level fader 1524.

The summer 1526 sums the output of the first level fader 1522 and the subsequent level fader 1524 to create the right ear delay 1518.

Thus, the right cross-fader 1530 cross-fades between the input signal 1514 delayed by the first time and the input signal 1514.

Figure 16A:
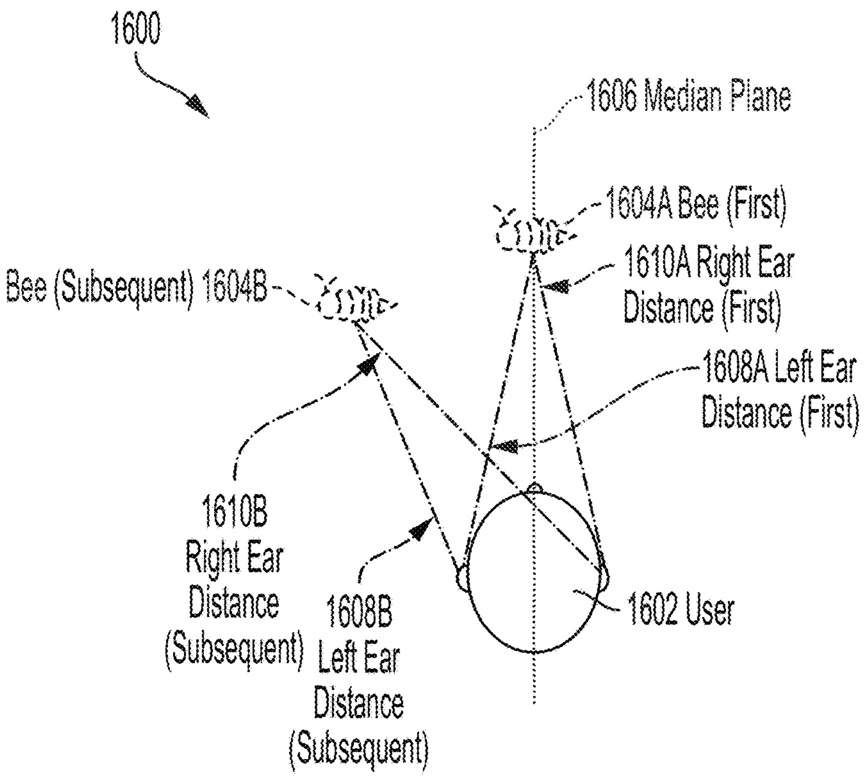
FIGS. 16A-16B illustrate an example virtual sound source with respect to a listener, and an example corresponding delay module including a cross-fader, respectively, according to some embodiments of the disclosure.

FIG. 16A illustrates an environment 1600 including a user 1602 and a virtual object (bee) 1604A on a median plane 1606 at a first time and a virtual object (bee) 1604B left of the median plane 1606 at a subsequent time, according to some embodiments. At the first time, a distance 1608A from the virtual bee 1604A to a left ear of the user 1602 is the same as a distance 1610A from the virtual bee 1604A to a right ear of the user 1602. As such, at the first time, it should take sound from the virtual bee 1604A the same time to reach the left ear than the right ear. At the subsequent time, a distance 1610B from the virtual bee 1604B to the right ear is greater than a distance 1608B from the virtual bee 1604A to the left ear. As such, at the subsequent time, it should take sound from the virtual bee 1604B longer to reach the right ear than the left ear. Comparing the distances 1610A and 1610B, it should take sound from the virtual bee 1604B at the subsequent time longer to reach the right ear than sound from the virtual bee 1604A at the first time since the distance 1610B is greater than the distance 1610A. Comparing the distances 1608A and 1608B, it should take sound from the virtual bee 1604A at the first time the same time to reach the left ear as sound from the virtual bee 1604B at the subsequent time.

Figure 16B:
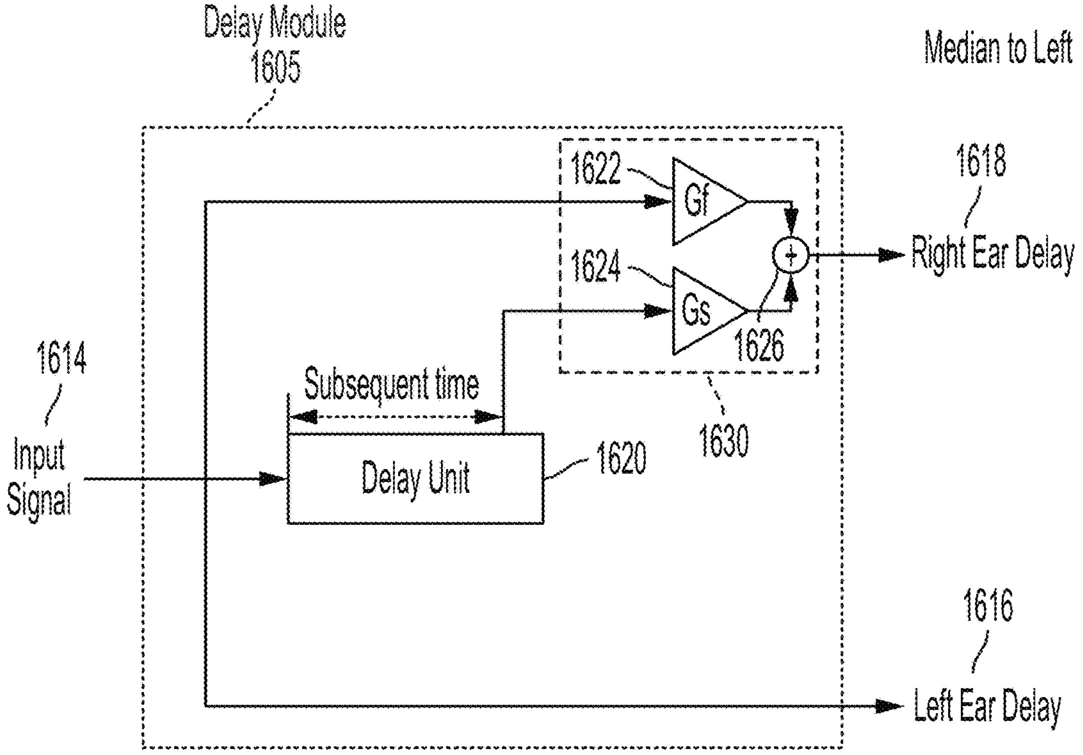

FIG. 16B illustrates a delay module 1612 corresponding to the environment 1600 of FIG. 16A, according to some embodiments. The delay module 1612 may be used to implement delay module 105 shown in example system 100. The delay module 1612 receives an input signal 1614 and outputs a left ear delay 1616 and a right ear delay 1618. The delay module 1612 includes a delay unit 1620 and a right cross-fader 1630. The right cross-fader 1330 includes a first level fader (Gf) 1622, a subsequent level fader (Gs) 1624, and a summer 1626.

At the first time the distance 1608A is the same as the distance 1610A. For the first time, the input signal 1614 is supplied directly to the left ear delay 1616, and the input signal 1614 is supplied directly to the first level fader 1622.

At the subsequent time the distance 1610B is greater than the distance 1608B. For the subsequent time, the input signal 1614 is supplied directly to the left ear delay 1616, and the delay unit 1620 delays the input signal 1614 by a subsequent time and supplies the input signal 1614 delayed by the subsequent time to the subsequent level fader 1624.

The summer 1626 sums the output of the first level fader 1622 and the subsequent level fader 1624 to create the right ear delay 1618.

Thus, the right cross-fader 1630 cross-fades between the input signal 1614 and the input signal 1614 delayed by the subsequent time.

Figure 17:
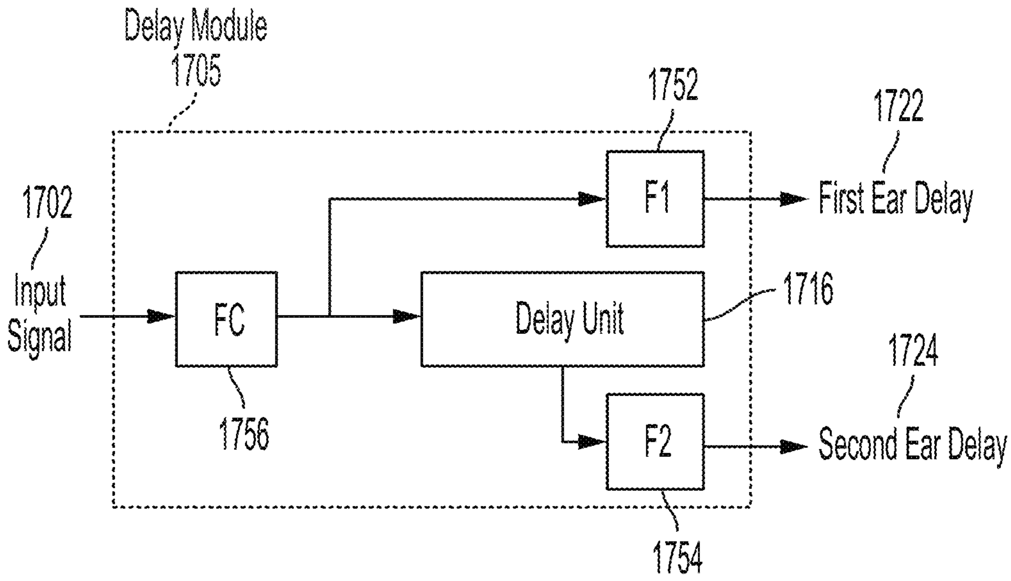
FIG. 17 illustrates an example delay module, according to some embodiments of the disclosure.

FIG. 17 illustrates an example delay module 1705 that, in some embodiments, can be used to implement delay module 105 shown in example system 100. In some embodiments, for example, as illustrated in FIG. 17, a delay module 1705 may include one or more filters (e.g., common filter FC 1756, a first filter F1 1752, and a second filter F2 1754). The first filter F1 1752 and the second filter F2 1754 may be used to model one or more effects of sound, for example, when a sound source is in a near-field. For example, the first filter F1 1752 and the second filter F2 1754 may be used to model one or more effects of sound when the sound source moves close to or away from a speaker/ear position. The common filter FC 1756 may be used to model one or more effects such as a sound source being obstructed by an object, air absorption, and the like which may affect the signal to both ears. The first filter F1 1752 may apply a first effect, the second filter F2 1754 may apply a second effect, and the common filter FC 1756 may apply a third effect.

In the example shown, an input signal 1702 is input to the delay module 1705; for example, input signal 1702 can be applied to an input of common filter FC 1756. The common filter FC 1756 applies one or more filters to the input signal 1702 and outputs a common filtered signal. The common filtered signal is input to both the first filter F1 1752 and a delay unit 1716. The first filter F1 1752 applies one or more filters to the common filtered signal and outputs a first filtered signal referred to as a first ear delay 1722. The delay unit 1716 applies a delay to the common filtered signal and outputs a delayed common filtered signal. The second filter F2 1754 applies one or more filters to the delayed common filtered signal and outputs a second filtered signal referred to as a second ear delay 1724. In some embodiments, the first ear delay 1722 may correspond to a left ear and the second ear delay 1724 may correspond to a right ear. In some embodiments, the first ear delay 1722 may correspond to a right ear and the second ear delay 1724 may correspond to a left ear.

In some embodiments, not all three of the filters illustrated in FIG. 17—the common filter FC 1756, the first filter F1 1752, and the second filter F2 1754—may be needed. In one example, since the signal input to the first filter F1 1752 and the signal input to the second filter F2 1754 both have the effect of the common filter FC 1756 applied to it, the common filter FC 1756 setting may be applied/added to each of the first filter F1 1752 and the second filter F2 1754, and the common filter FC 1756 may be removed, thus reducing the total number of filters from three to two.

The delay module 1705 may be analogous to the delay module 205 of FIG. 2B where the first ear delay 226 of FIG. 2B corresponds to the second ear delay 1724 of FIG. 17, and the second ear delay 228 of FIG. 2B corresponds to the first ear delay 1722 of FIG. 17. In this embodiment, the first ear delay 1722 has no delay and the second ear delay 1724 has a delay. This may be the case, for example, when a sound source is closer to first ear than a second ear, where the first ear receives the first ear delay 1722 and the second ear receives the second ear delay 1724. One of ordinary skill in the art would appreciate that although the following description primarily relates to the a variation of FIG. 2B, the principles may apply to variations of FIGS. 2A and 2C as well.

Figure 18A:
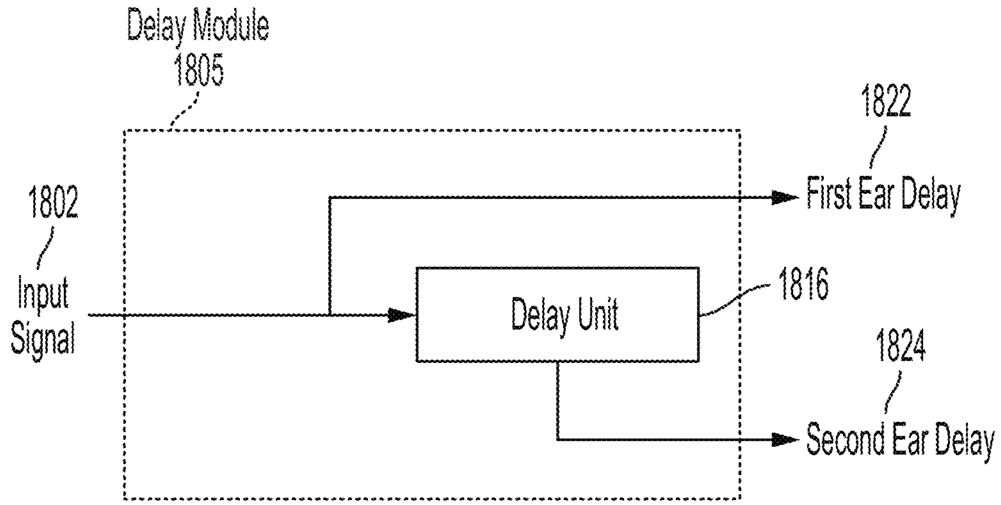
FIGS. 18A-18E illustrate example delay modules, according to some embodiments of the disclosure.
Figure 18B:
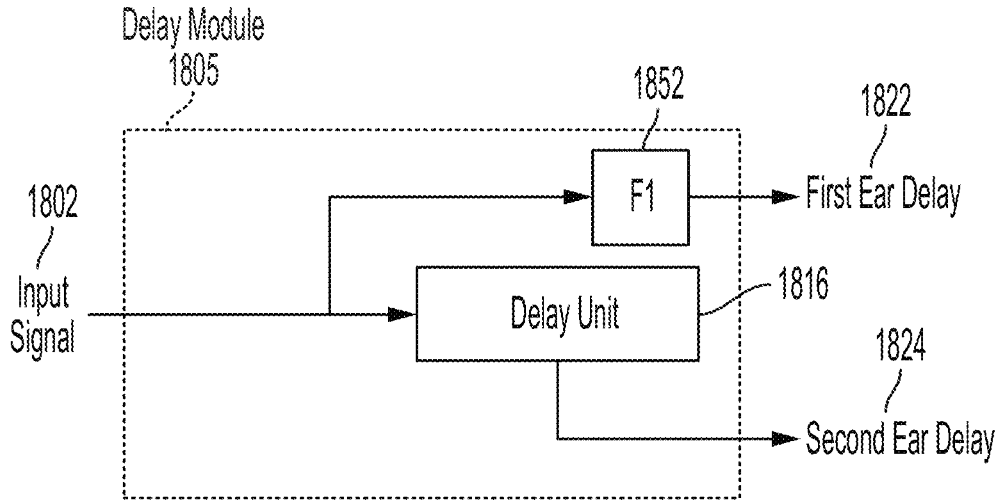
Figure 18C:
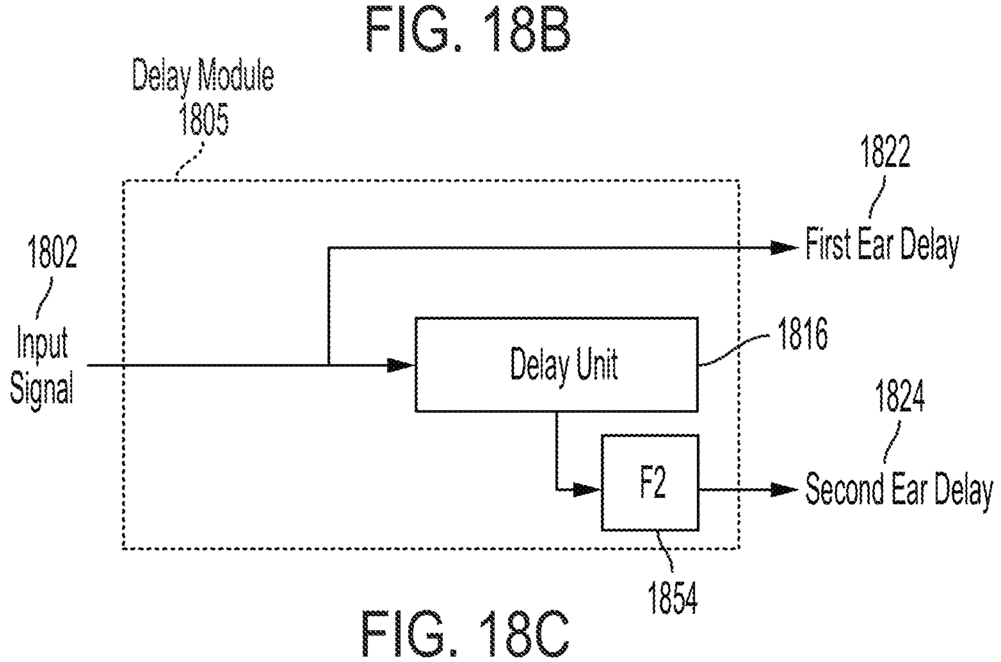
Figure 18D:
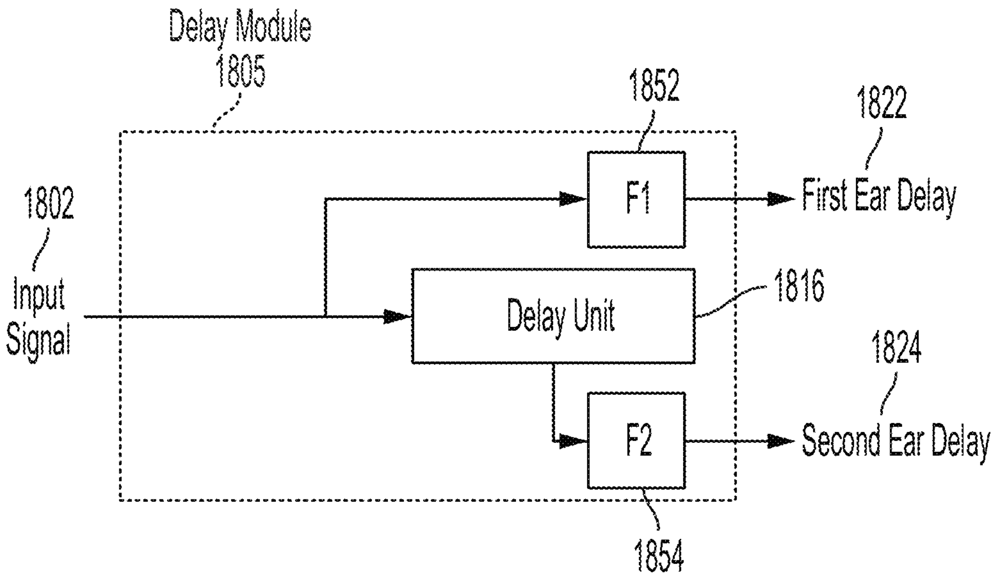
Figure 18E:
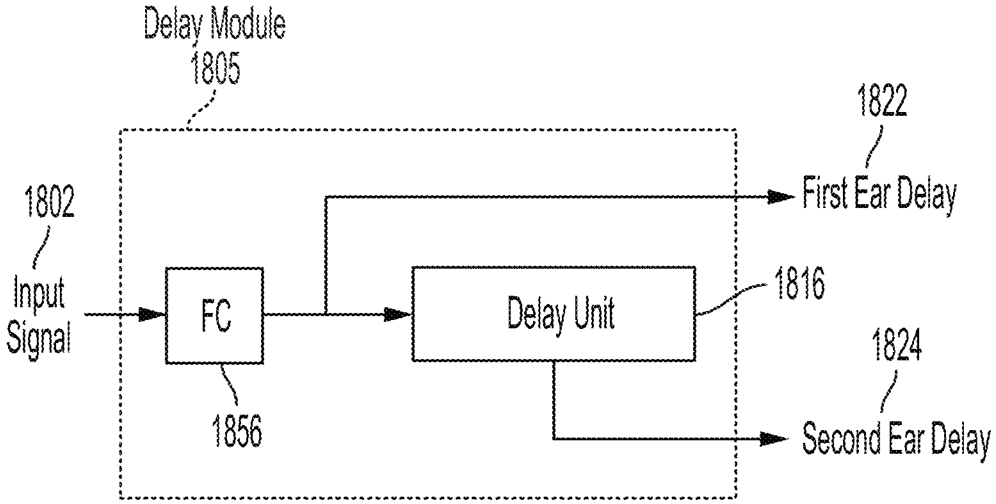

FIGS. 18A-18E illustrate variations of a delay module 1805, according to some embodiments. Any of the variations of delay module 1805 shown in FIGS. 18A-18E may be used to implement delay module 105 shown in example system 100. FIG. 18A illustrates a delay module 1805 with no filters. The delay module 1805 may need no filters, for example, when a sound source is in a far-field. FIG. 18B illustrates a delay module 1805 with only a first filter F1 1852. The delay module 1805 may need only the first filter F1 1852, for example, when the sound source is closer to the first ear and only the first ear is obstructed by an object. FIG. 18C illustrates a delay module 1805 with only a second filter F2 1854. The delay module 1805 may need only the second filter F2 1854, for example, when the sound source is farther from the second ear and only the second ear is obstructed by an object. FIG. 18D illustrates a delay module 1805 with a first filter F1 1852 and a second filter F2 1854, where the first filter F1 1852 and the second filter F2 1854 are different. The delay module 1805 may need the first filter F1 1852 and the second filter F2 1854, for example, when the sound source is closer to the first ear and each ear is obstructed by different sized objects. FIG. 18E illustrates a delay module 1805 with only a common filter FC 1856. The delay module 1805 may need only the common filter CF 1856, for example, when the source is far field and both ears are equally obstructed or there is air absorption.

In some embodiments, any one of the delay modules illustrated in FIGS. 18A-18E may transition to any of the other delay modules illustrated in FIGS. 18A-18E due to changes in the soundscape such as the movement of obstructing objects or the sound sources relative to them.

Transitioning from the delay module 1805 illustrated in FIG. 18A (which includes no filters) to any of the delay modules 1805 illustrated in FIGS. 18B-18E (each of which includes one or more filters) may include simply introducing the one or more filters at the appropriate/desired time. Similarly, transitioning to the delay module 1805 illustrated in FIG. 18A from the delay modules 1805 illustrated in FIGS. 18B-18E may include simply removing the one or more filters at the appropriate/desired time.

Transitioning from the delay module 1805 illustrated in FIG. 18B (including the first filter F1 1852) to the delay module 1805 illustrated in FIG. 18C (including the second filter F2 1854) may include removing the first filter F1 1852 and adding the second filter F2 1854 at the appropriate/desired time. Similarly, transitioning from the delay module 1805 illustrated in FIG. 18C (including the second filter F2 1854) to the delay module 1805 illustrated in FIG. 18B (including the first filter F1 1852) may include removing the second filter F2 1854 and adding the first filter F1 1852 at the appropriate/desired time.

Transitioning from the delay module 1805 illustrated in FIG. 18B (including the first filter F1 1852) to the delay module 1805 illustrated in FIG. 18D (including the first filter F1 1852 and the second filter F2 1854) may include adding the second filter F2 1854 at the appropriate/desired time. Similarly, transitioning from the delay module 1805 illustrated in FIG. 18D (including the first filter F1 1852) and the second filter F2 1854 to the delay module 1805 illustrated in FIG. 18B (including the first filter F1 1852) may include removing the second filter F2 1854 at the appropriate/desired time.

Transitioning from the delay module 1805 illustrated in FIG. 18B (including the first filter F1 1852) to the delay module 1805 illustrated in FIG. 18E (including the common filter FC 1856) may include adding the common filter 1856, copying the state of the first filter F1 1852 to the common filter FC 1856, and removing the first filter F1 1852 at the appropriate/desired time. Similarly, transitioning from the delay module 1805 illustrated in FIG. 18E (including the common filter FC 1856) to the delay module 1805 illustrated in FIG. 18B (including the first filter F1 1852) may include adding the first filter F1 1852, copying the state of the common filter FC 1856 to the first filter F1 1852, and removing the common filter FC 1856 at the appropriate/desired time.

Transitioning from the delay module 1805 illustrated in FIG. 18C (including the second filter F2 1854) to the delay module 1805 illustrated in FIG. 18D (including the first filter F1 1852 and the second filter F2 1854) may include adding the first filter F1 1852 at the appropriate/desired time. Similarly, transitioning from the delay module 1805 illustrated in FIG. 18D (including the first filter F1 1852) and the second filter F2 1854 to the delay module 1805 illustrated in FIG. 18C (including the second filter F2 1854) may include removing the first filter F1 1852 at the appropriate/desired time.

Figure 19:
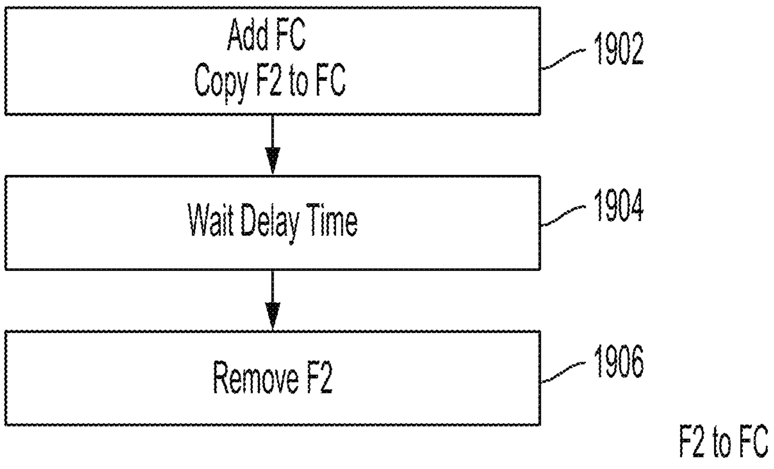
FIGS. 19-22 illustrate example processes for transitioning between delay modules, according to some embodiments of the disclosure.

Transitioning from the delay module 1805 illustrated in FIG. 18C (including the second filter F2 1854) to the delay module 1805 illustrated in FIG. 18E (including the common filter FC 1856) may include executing a process such as illustrated by example in FIG. 19. At stage 1902 of the example process, the common filter FC 1856 is added and the second filter F2 1854 state is copied to the common filter FC 1856. This may occur at time T1. At 1904, the system waits a delay time. The delay time is the amount of time the delay unit 1816 delays a signal. At 1906, the second filter F2 1854 is removed. This may occur at time T2.

The delay unit 1816 includes a first-in-first-out buffer. Before time T1, the delay unit 1816 buffer is filled with the input signal 1802. The second filter F2 1854 filters the output of the delay unit 1816 including just the input signal 1802 from before time T1. Between time T1 and time T2, the common filter FC 1856 filters the input signal 1802 and the delay unit 1816 buffer is filled with both the input signal 1802 from before T1 and the filtered input signal from between time T1 and time T2. The second filter F2 1854 filters the output of the delay unit 1816 including just the input signal 1802 from before time T1. At time T2, the second filter 1854 is removed and the delay unit 1816 is filled with only the filtered input signal starting at time T1.

In some embodiments, transitioning from the delay module 1805 illustrated in FIG. 18C (including the second filter F2 1854) to the delay module 1805 illustrated in FIG. 18E (including the common filter FC 1856) may include processing all samples in the delay unit 1816 with the second filter F2 1854 (or with another filter that has the same settings as the second filter F2 1854), writing the processed samples into the delay unit 1816, adding the common filter FC 1856 filter, copying the state of the second filter F2 1854 to the common filter FC 1856, and removing the second filter F2 1854. In some embodiments, all the aforementioned steps may occur at time T1. That is, all the aforementioned steps may occur at the same time (or about the same time). In some embodiments, the delay unit 1816 includes a first-in-first-out buffer. In these embodiments, in processing all samples in the delay unit 1816, the processing may go from the end of the buffer to the beginning (i.e., from the oldest sample to the newest).

Figure 20:
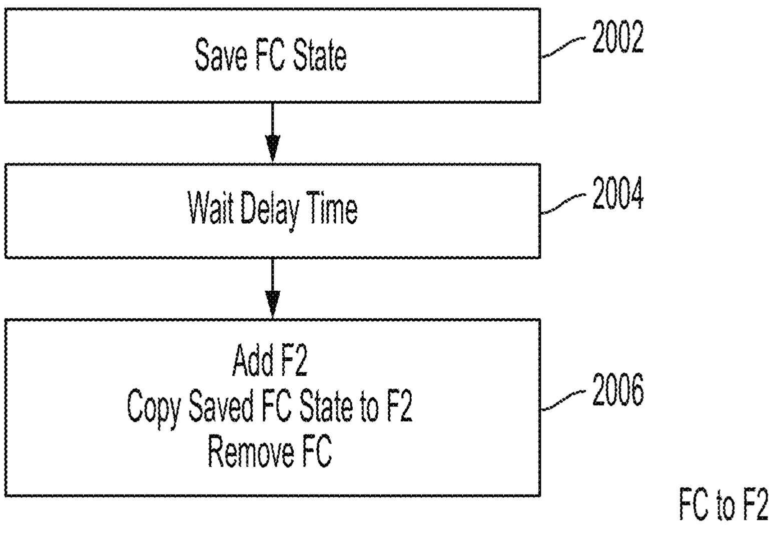

Transitioning from the delay module 1805 illustrated in FIG. 18E (including the common filter FC 1856) to the delay module 1805 illustrated in FIG. 18C (including the second filter F2 1854) may include executing a process such as illustrated by example in FIG. 20. At 2002, a state of the common filter FC 1856 is saved. This may occur at time T1. At 2004, the system waits a delay time. The delay time is the amount of time the delay unit 1816 delays a signal. At 2006, the second filter F2 1854 is added, the saved common filter FC 1856 state is copied into the second filter F2 1854, and the common filter FC 1856 is removed. This may occur at time T2.

The delay unit 1816 includes a first-in-first-out buffer. Before time T1, the common filter FC 1856 filters the input signal 1802 and the delay unit 1816 buffer is filled with the filtered input signal. Between time T1 and time T2, the common filter FC 1856 continues to filter the input signal 1802 and the delay unit 1816 buffer continues to be filled with the filtered input signal. At time T2, the second filter F2 1854 is added, the saved common filter FC 1856 state is copied into the second filter F2 1854, and the common filter FC 1856 is removed.

Figure 21:
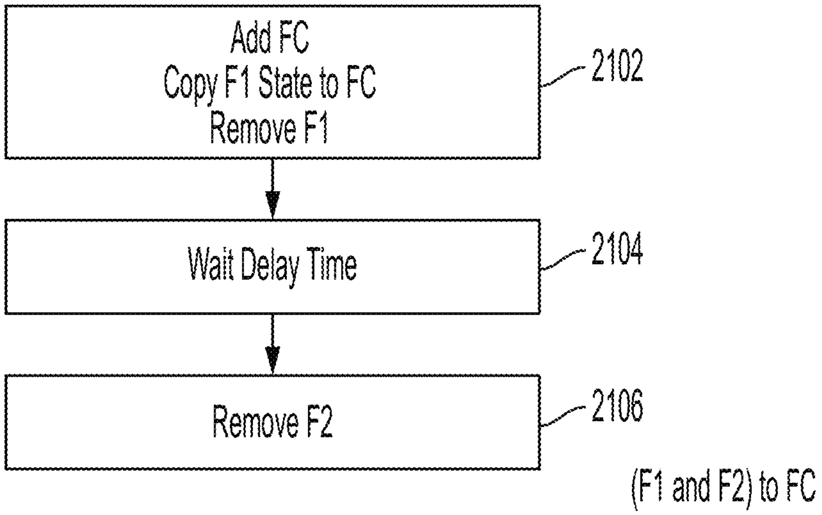

Transitioning from the delay module 1805 illustrated in FIG. 18D (including the first filter F1 1852 and the second filter F2 1854) to the delay module 1805 illustrated in FIG. 18E (including the common filter FC 1856) may include executing the process illustrated by example in FIG. 21. At 2102, the common filter FC 1856 is added, the state of the first filter F1 1852 is copied to the common filter FC 1856, and the first filter F1 1852 is removed. This can occur at time T1. At 2104, the system waits a delay time. The delay time is the amount of time the delay unit 1816 delays a signal. At 2106, the second filter F2 1854 is removed. This may occur at time T2.

The delay unit 1816 includes a first-in-first-out buffer. Before time T1, the delay unit 1816 buffer is filled with the input signal 1802. The second filter F2 1854 filters the output of the delay unit 1816 including just the input signal 1802 from before time T1. Between time T1 and time T2, the common filter FC 1856 filters the input signal 1802 and the delay unit 1816 buffer is filled with both the input signal 1802 from before T1 and the filtered input signal from between time T1 and time T2. The second filter F2 1854 filters the output of the delay unit 1816 including just the input signal 1802 from before time T1. At time T2, the second filter 1854 is removed and the delay unit 1816 is filled with only the filtered input signal starting at time T1.

Figure 22:
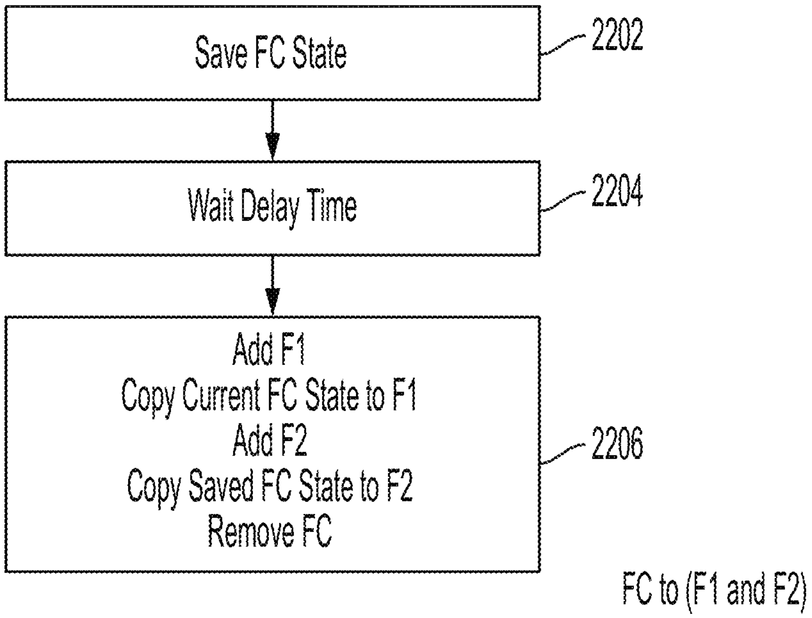

Transitioning from the delay module 1805 illustrated in FIG. 18E (including the common filter FC 1856) to the delay module 1805 illustrated in FIG. 18E (including the first filter F1 1852 and the second filter F2 1854) may include executing the process illustrated by example in FIG. 22. At 2202, a state of the common filter FC 1856 is saved. This may occur at time T1. At 2204, the system waits a delay time. The delay time is the amount of time the delay unit 1816 delays a signal. At 2206, the first filter F1 1852 is added, the saved common filter FC 1856 state is copied into the first filter F1 1852, the second filter F2 1854 is added, the saved common filter FC 1856 state is copied into the second filter F2 1854, and the common filter FC 1856 is removed. This may occur at time T2.

The delay unit 1816 includes a first-in-first-out buffer. Before time T1, the common filter FC 1856 filters the input signal 1802 and the delay unit 1816 buffer is filled with the filtered input signal. Between time T1 and time T2, the common filter FC 1856 continues to filter the input signal 1802 and the delay unit 1816 buffer continues to be filled with the filtered input signal. At time T2, the first filter F1 1852 is added, the saved common filter FC 1856 state is copied into the first filter 1852, the second filter F2 1854 is added, the saved common filter FC 1856 state is copied into the second filter F2 1854, and the common filter FC 1856 is removed.

Various exemplary embodiments of the disclosure are described herein. Reference is made to these examples in a non-limiting sense. They are provided to illustrate more broadly applicable aspects of the disclosure. Various changes may be made to the disclosure described and equivalents may be substituted without departing from the true spirit and scope of the disclosure. In addition, many modifications may be made to adapt a particular situation, material, composition of matter, process, process act(s) or step(s) to the objective(s), spirit or scope of the present disclosure. Further, as will be appreciated by those with skill in the art that each of the individual variations described and illustrated herein has discrete components and features which may be readily separated from or combined with the features of any of the other several embodiments without departing from the scope or spirit of the present disclosure. All such modifications are intended to be within the scope of claims associated with this disclosure.

The disclosure includes methods that may be performed using the subject devices. The methods may include the act of providing such a suitable device. Such provision may be performed by the end user. In other words, the "providing" act merely requires the end user obtain, access, approach, position, set-up, activate, power-up or otherwise act to provide the requisite device in the subject method. Methods recited herein may be carried out in any order of the recited events which is logically possible, as well as in the recited order of events.

Exemplary aspects of the disclosure, together with details regarding material selection and manufacture have been set forth above. As for other details of the present disclosure, these may be appreciated in connection with the above-referenced patents and publications as well as generally known or appreciated by those with skill in the art. The same may hold true with respect to method-based aspects of the disclosure in terms of additional acts as commonly or logically employed.

In addition, though the disclosure has been described in reference to several examples optionally incorporating various features, the disclosure is not to be limited to that which is described or indicated as contemplated with respect to each variation of the disclosure. Various changes may be made to the disclosure described and equivalents (whether recited herein or not included for the sake of some brevity) may be substituted without departing from the true spirit and scope of the disclosure. In addition, where a range of values is provided, it is understood that every intervening value, between the upper and lower limit of that range and any other stated or intervening value in that stated range, is encompassed within the disclosure.

Also, it is contemplated that any optional feature of the variations described may be set forth and claimed independently, or in combination with any one or more of the features described herein. Reference to a singular item, includes the possibility that there are plural of the same items present. More specifically, as used herein and in claims associated hereto, the singular forms "a," "an," "said," and "the" include plural referents unless the specifically stated otherwise. In other words, use of the articles allow for "at least one" of the subject item in the description above as well as claims associated with this disclosure. It is further noted that such claims may be drafted to exclude any optional element. As such, this statement is intended to serve as antecedent basis for use of such exclusive terminology as "solely," "only" and the like in connection with the recitation of claim elements, or use of a "negative" limitation.

Without the use of such exclusive terminology, the term "comprising" in claims associated with this disclosure shall allow for the inclusion of any additional element—irrespective of whether a given number of elements are enumerated in such claims, or the addition of a feature could be regarded as transforming the nature of an element set forth in such claims. Except as specifically defined herein, all technical and scientific terms used herein are to be given as broad a commonly understood meaning as possible while maintaining claim validity.

The breadth of the present disclosure is not to be limited to the examples provided and/or the subject specification, but rather only by the scope of claim language associated with this disclosure.

What is claimed is:

1. A method of presenting an audio signal to a user of a wearable head device, the method comprising:

- receiving a first input audio signal, wherein the first input audio signal corresponds to a first location of a virtual object in a virtual environment at a first time;
- generating a first output audio signal and a second output audio signal, wherein the generating the first output audio signal and the second output audio signal comprises applying a first interaural time delay (ITD) to the first input audio signal based on the first location;
- presenting the first output audio signal to the user via a first speaker associated with the wearable head device;
- presenting the second output audio signal to the user via a second speaker associated with the wearable head device;
- receiving a second input audio signal, wherein the second input audio signal corresponds to a second location of the virtual object in the virtual environment at a second time, wherein:
  - the virtual object is at the first location in the virtual environment at the first time, and the virtual object is at the second location in the virtual environment at the second time,
  - the wearable head device has a first orientation vector at the first time,
  - the wearable head device has a second orientation vector at the second time, and
  - the first location in the virtual environment relative to the first orientation vector is different from the second location in the virtual environment relative to the second orientation vector;
- generating a third output audio signal and a fourth output audio signal, wherein the generating the third output audio signal and the fourth audio signal comprises applying a second ITD to the second input audio signal based on the second location;
- presenting the third output audio signal to the user via the first speaker; and
- presenting the fourth output audio signal to the user via the second speaker.

2. The method of claim 1, wherein the generating the first output audio signal and the second output audio signal comprises applying a filter to the first input audio signal.

3. The method of claim 1, wherein the generating the third output audio signal and the fourth audio signal comprises applying a filter to the second input audio signal.

4. The method of claim 1, wherein the generating the first output audio signal and the second output audio signal comprises applying a gain to the first input audio signal, wherein the gain is determined based on the first ITD.

5. The method of claim 1, wherein the generating the third output audio signal and the fourth audio signal comprises applying a gain to the second input audio signal, wherein the gain is determined based on the second ITD.

6. The method of claim 1, wherein the generating the first output audio signal and the second output audio signal comprises applying a head-related transfer function (HRTF) to the first input audio signal, wherein the HRTF is determined based on the first ITD.

7. The method of claim 1, wherein the generating the third output audio signal and the fourth audio signal comprises applying a HRTF to the second input audio signal, wherein the HRTF is determined based on the second ITD.

8. The method of claim 1, further comprising:

- cross-fading the first output audio signal and the third output audio signal; and
- cross-fading the second output audio signal and the fourth output audio signal.

9. The method of claim 1, wherein the virtual object moves from the first location to the second location between the first time and the second time.

10. The method of claim 1, further comprising determining, via one or more sensors of the wearable head device, one or more of the first orientation vector and the second orientation vector.

11. The method of claim 1, wherein the first location is on a first side of a median plane associated with the user, and the second location is on a second side of the median plane.

12. The method of claim 1, wherein the first ITD 15 determined based on a distance from the first location to a first ear of the user and a distance from the first location to a second ear of the user.

13. The method of claim 1, wherein the second ITD 15 determined based on a distance from the second location to a first ear of the user and a distance from the second location to a second ear of the user.

14. A system comprising:

- a first speaker associated with a wearable head device;
- a second speaker associated with the wearable head device; and
- one or more processors configured to perform a method comprising:
  - receiving a first input audio signal, wherein the first input audio signal corresponds to a first location of a virtual object in a virtual environment at a first time;
  - generating a first output audio signal and a second output audio signal, wherein the generating the first output audio signal and the second output audio signal comprises applying ITD to the first input audio signal based on the first location;

presenting the first output audio signal to the user via the first speaker;

presenting the second output audio signal to the user via the second speaker;

receiving a second input audio signal, wherein the second input audio signal corresponds to a second location of the virtual object in the virtual environment at a second time, wherein:

the virtual object is at the first location in the virtual environment at the first time, and the virtual object is at the second location in the virtual environment at the second time, the wearable head device has a first orientation vector at the first time, the wearable head device has a second orientation vector at the second time, and the first location in the virtual environment relative to the first orientation vector is different from the second location in the virtual environment relative to the second orientation vector;

generating a third output audio signal and a fourth output audio signal, wherein the generating the third output audio signal and the fourth audio signal comprises applying a second ITD to the second input audio signal based on the second location;

presenting the third output audio signal to the user via the first speaker; and presenting the fourth output audio signal to the user via the second speaker.

15. The system of claim 14, wherein the generating the first output audio signal and the second output audio signal comprises applying a filter to the first input audio signal.

16. The system of claim 14, wherein the generating the first output audio signal and the second output audio signal comprises applying a gain to the first input audio signal, wherein the gain is determined based on the first ITD.

17. The system of claim 14, wherein the generating the first output audio signal and the second output audio signal comprises applying a HRTF to the first input audio signal, wherein the HRTF is determined based on the first ITD.

18. The system of claim 14, wherein the method further comprises:

cross-fading the first output audio signal and the third output audio signal; and cross-fading the second output audio signal and the fourth output audio signal.

19. The system of claim 14, wherein:

the wearable head device comprises one or more sensors, and the method further comprises determining, via the one or more sensors, one or more of the first orientation vector and the second orientation vector.

20. A non-transitory computer-readable medium storing instructions which, when executed by one or more processors, cause the one or more processors to perform a method comprising:

receiving a first input audio signal, wherein the first input audio signal corresponds to a first location of a virtual object in a virtual environment at a first time;

generating a first output audio signal and a second output audio signal, wherein the generating the first output audio signal and the second output audio signal comprises applying a first interaural time delay (ITD) to the first input audio signal based on the first location;

presenting the first output audio signal to the user via a first speaker associated with the wearable head device;

presenting the second output audio signal to the user via a second speaker associated with the wearable head device;

receiving a second input audio signal, wherein the second input audio signal corresponds to a second location of the virtual object in the virtual environment at a second time, wherein:

the virtual object is at the first location in the virtual environment at the first time, and the virtual object is at the second location in the virtual environment at the second time, the wearable head device has a first orientation vector at the first time, the wearable head device has a second orientation vector at the second time, and the first location in the virtual environment relative to the first orientation vector is different from the second location in the virtual environment relative to the second orientation vector;

generating a third output audio signal and a fourth output audio signal, wherein the generating the third output audio signal and the fourth audio signal comprises applying a second ITD to the second input audio signal based on the second location;

presenting the third output audio signal to the user via the first speaker; and presenting the fourth output audio signal to the user via the second speaker.

* * * * *